US012464370B2

(12) United States Patent
Yoo

(10) Patent No.: US 12,464,370 B2
(45) Date of Patent: Nov. 4, 2025

(54) APPARATUS AND METHOD FOR SPECTRUM SHARING IN WIRELESS COMMUNICATION SYSTEM

(71) Applicant: SAMSUNG ELECTRONICS CO., LTD., Suwon-si (KR)

(72) Inventor: Seungbo Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 320 days.

(21) Appl. No.: 18/083,177

(22) Filed: Dec. 16, 2022

(65) Prior Publication Data

US 2023/0123247 A1 Apr. 20, 2023

Related U.S. Application Data

(63) Continuation of application No. PCT/KR2021/007685, filed on Jun. 18, 2021.

(30) Foreign Application Priority Data

Jun. 18, 2020 (KR) ........................ 10-2020-0074385

(51) Int. Cl.
*H04W 16/14* (2009.01)
*H04W 28/02* (2009.01)

(52) U.S. Cl.
CPC ....... *H04W 16/14* (2013.01); *H04W 28/0268* (2013.01)

(58) Field of Classification Search
CPC . H04W 16/14; H04W 28/0268; H04W 72/04; H04W 72/12; H04W 72/54;

(Continued)

(56) References Cited

U.S. PATENT DOCUMENTS

| 10,004,070 B2 | 6/2018 | Xiang et al. |
| 2004/0028003 A1 | 2/2004 | Diener et al. |

(Continued)

FOREIGN PATENT DOCUMENTS

| JP | 2014-509123 A | 4/2014 |
| KR | 10-2019-0105081 A | 9/2019 |

(Continued)

OTHER PUBLICATIONS

International Search Report (PCT/ISA/210) issued Oct. 1, 2021 by the International Searching Authority in International Application No. PCT/KR2021/007685.

(Continued)

*Primary Examiner* — Mewale A Ambaye
(74) *Attorney, Agent, or Firm* — Sughrue Mion, PLLC

(57) ABSTRACT

The present disclosure relates to a $5^{th}$ generation (5G) or pre-5G communication system for supporting a higher data transmission rate than a $4^{th}$ generation (4G) communication system such as long term evolution (LTE). A method performed by a distributed unit (DU) in a wireless communication system is provided. The method may include transmitting, to another node supporting a second cell that shares a frequency band of a specified range with a first cell of the base station, a message including information related to spectrum sharing via a DU interface, wherein the information related to the spectrum sharing includes identification information on the first cell and identification information on the second cell.

16 Claims, 11 Drawing Sheets

(58) Field of Classification Search
CPC ... H04W 28/082; H04W 72/27; H04W 28/08; H04W 88/08; H04W 92/20
See application file for complete search history.

(56) References Cited

U.S. PATENT DOCUMENTS

| | | |
|---|---|---|
| 2012/0082100 A1 | 4/2012 | Ahmadi |
| 2013/0142116 A1 | 6/2013 | Prakash et al. |
| 2015/0289141 A1 | 10/2015 | Ghasemzadeh et al. |
| 2018/0241446 A1 | 8/2018 | Fakoorian et al. |
| 2018/0343588 A1 | 11/2018 | Sadek et al. |
| 2019/0335337 A1 | 10/2019 | Damnjanovic et al. |
| 2019/0357264 A1 | 11/2019 | Yi et al. |
| 2020/0008250 A1 | 1/2020 | Wang et al. |
| 2021/0058970 A1* | 2/2021 | Kwak .................... H04W 72/23 |
| 2023/0164820 A1* | 5/2023 | Talarico .............. H04W 72/512 370/329 |
| 2023/0413064 A1* | 12/2023 | Huang .................. H04W 16/14 |
| 2024/0137970 A1* | 4/2024 | Rastegardoost ...... H04W 72/40 |
| 2024/0283594 A1* | 8/2024 | Ma ........................ H04L 5/0048 |
| 2024/0373459 A1* | 11/2024 | Park ...................... H04W 80/08 |

FOREIGN PATENT DOCUMENTS

| | | |
|---|---|---|
| WO | 2019/145878 A1 | 8/2019 |
| WO | 2020-067715 A1 | 4/2020 |

OTHER PUBLICATIONS

Written Opinion (PCT/ISA/237) issued Oct. 1, 2021 by the International Searching Authority for International Application No. PCT/KR2021/007685.
"3rd Generation Partnership Project; Technical Specification Group Radio Access Network; NG-RAN; Xn application protocol (XnAP)", Sep. 2018, 3rd Generation Partnership Project (3GPP TM), 3GPP TS 38.423 V15.1.0, 263 pages total.
"Feasibility study on Dynamic spectrum sharing interface enhancement", Mar. 2020, 3GPP TSG RAN Meeting #87e, RP-200219, 4 pages total.
Communication dated Mar. 12, 2024, issued by the Korean Intellectual Property Office in Korean Patent Application No. 10-2020-0074385.
Communication dated May 6, 2024, issued by the INDIA Intellectual Property Office in Indian Patent Application No. 202317002439.
Communication issued Nov. 21, 2023 by the European Patent Office in European Patent Application No. 21826859.7.
Huawei, "Resource coordination function in W1 interface", 3GPP TSG-RAN WG3 Meeting #103bis, Xi'an, China, Apr. 8-12, 2019, R3-191966, Agenda item: 12.2. (2 pages total), XP051695416.
Ericsson et al., "(TP for NR BL CR for TS 36.423): E-UTRA—NR resource allocation coordination over X2", 3GPP TSG-RAN WG3 Meeting #99bis, Busan, Republic of Korea, May 21-25, 2018, R3-182940, Agenda Item: 10.14.1. (19 pages total), XP051503535.
Communication dated Jun. 29, 2025, issued by the China National Intellectual Property Administration in Chinese Application No. 202180043729.5.
Communication dated Jul. 21, 2025, issued by the Korean Patent Office in Korean Application No. 10-2020-0074385.

* cited by examiner

APPARATUS AND METHOD FOR SPECTRUM SHARING IN WIRELESS COMMUNICATION SYSTEM

CROSS-REFERENCE TO RELATED APPLICATION(S)

This is a bypass continuation application of International Application No. PCT/KR2021/007685, filed on Jun. 18, 2021, which is based on and claims priority to Korean Patent Application No. 10-2020-0074385, filed on Jun. 18, 2020, in the Korean Intellectual Property Office, the disclosures of which are incorporated by reference herein in their entireties.

BACKGROUND

1. Field

The present disclosure relates generally to a wireless communication system, and more particularly to an apparatus and method for spectrum sharing in a wireless communication system.

2. Description of Related Art

To meet the increasing demand for wireless data traffic after commercialization of a $4^{th}$ generation (4G) communication system, efforts are being made to develop an improved $5^{th}$ generation (5G) communication system or a pre-5G communication system. For this reason, the 5G communication system or the pre-5G communication system is called a beyond 4G Network communication system or a post long term evolution (LTE) system.

In order to achieve a high data rate, the 5G communication system is being considered for implementation in an ultra-high frequency (mmWave) band (e.g., such as a 60 gigabyte (60 GHz) band). In order to alleviate a path loss of radio waves and increase a propagation distance of radio waves in the ultra-high frequency band, the 5G communication system is being discussed on beamforming, massive MIMO, full dimensional MIMO (FD-MIMO), an array antenna, analog beam-forming, and large scale antenna technologies.

Also, for network improvement of the system, in the 5G communication system, technologies such as an evolved small cell, an advanced small cell, a cloud radio access network (cloud RAN), an ultra-dense network, device to device communication (D2D), wireless backhaul, moving network, cooperative communication, coordinated multi-points (CoMP), and reception interference cancellation, etc. are being developed.

Further, in the 5G system, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access technologies, are being developed.

With the introduction of the 5G communication system, network and telecommunication operators are required to build an infrastructure for the 5G communication system. As such, the introduction of a new radio access technology (RAT) can act as a burden on the operators. In order to solve this burden, a technology of dynamic spectrum sharing (DSS) is being discussed.

Provided are an apparatus and method for dynamic spectrum sharing (DSS) in a wireless communication system.

Also, provided are an apparatus and method for signaling related to spectrum sharing between DUs of a base station in a wireless communication system.

SUMMARY

According to an aspect of the disclosure, a method performed by a distributed unit (DU) in a wireless communication system is provided. The method may include transmitting, to another node supporting a second cell that shares a frequency band of a specified range with a first cell of the base station, a message comprising information related to spectrum sharing via a DU interface, wherein the information related to the spectrum sharing comprises identification information on the first cell and identification information on the second cell.

According to an aspect of the disclosure, a method performed by a base station in a wireless communication system is provided. The method may include receiving, from a distributed unit (DU) of another node supporting a first cell, a message comprising information related to spectrum sharing via a DU interface, wherein the first cell and a second cell of the base station share a frequency band of a specified range, and wherein the information related to the spectrum sharing comprises identification information on the first cell and identification information on the second cell.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
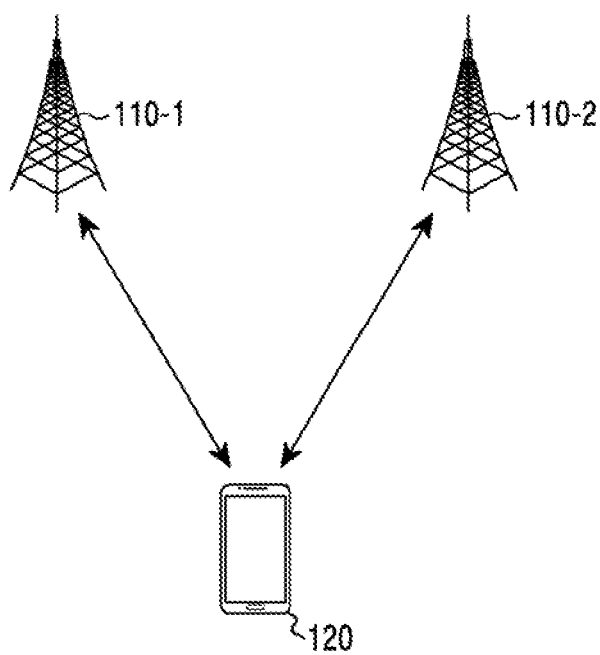
FIG. 1 illustrates a wireless communication system according to various embodiments of the present disclosure.

Terms used in the present disclosure are used only to describe specific embodiments, and may not be intended to limit the scope of other embodiments. The singular expression may include the plural expression unless the context clearly dictates otherwise. Terms used herein, including technical or scientific terms, may have the same meanings as commonly understood by a person having ordinary skill in the art described in the present disclosure. Among the terms used in the present disclosure, terms defined in a general dictionary may be interpreted as the same or similar meaning as the meaning in the context of the related art, and unless explicitly defined in the present disclosure, are not interpreted as ideal or excessively formal meanings. In some cases, even terms defined in the present disclosure may not be construed to exclude embodiments of the present disclosure.

In various embodiments of the present disclosure described below, a hardware access method will be described as an example. However, since the various embodiments of the present disclosure include technology using both hardware and software, the various embodiments of the present disclosure do not exclude a software-based approach method.

Also, the present disclosure describes various embodiments by using terms used in some communication standards (e.g., long term evolution (LTE) and new radio (NR) which are defined in 3rd generation partnership project (3GPP)), but this is only an example for description. The various embodiments of the present disclosure may be easily modified and applied even in other communication systems.

Also, in the present disclosure, the expression of more than or less than has been used in order to determine whether a specific condition is satisfied or fulfilled, but this is only a description for expressing an example, and does not exclude a description of equal to or more than, or equal to or less than. A condition described as 'equal to or more than' may be replaced with 'more than', and a condition described as 'equal to or less than' may be replaced with 'less than', and a condition described as 'equal to or more than and less than' may be replaced with 'more than and equal to or less than'.

Hereinafter, the present disclosure describes a technology for a system that coexists and is necessary for service in the same frequency spectrum between the same or heterogeneous radio access technologies (RATs) in a wireless communication system, and an interworking method. Conventionally, there is no interface mutually provided between base stations in which different core networks are interworked for spectrum sharing, and even in the case of a core network of the same type, only an indirect resource coordination procedure in a CU has been defined. Although a resource coordination procedure between CUs of the existing base station has been described for spectrum sharing, there are a lot of time delays due to interworking between CUs and between DUs and also, there is a problem in which it is difficult to perform real-time spectrum sharing due to limited procedures and information elements (IE). Accordingly, various embodiments of the present disclosure provide an interworking procedure, related signaling, and information through a direct interface between DUs, in order to achieve real-time dynamic spectrum sharing (DSS).

A term for identifying an access node used in the following description, a term referring to network entities, a term referring to messages, a term referring to signaling, a term referring to an interface between network objects, a term referring to various identification information, etc. are exemplified for convenience of description. Accordingly, the present invention is not limited to the terms described below, and other terms referring to objects having equivalent technical meanings may be used.

FIG. 1 illustrates a wireless communication system according to various embodiments of the present disclosure. FIG. 1 illustrates base stations 110-1 and 110-2 and a terminal 120, as some of nodes that use a radio channel in the wireless communication system. The base stations 110-1 and 110-2 may perform communication while sharing the same spectrum band with the terminal 120. Hereinafter, for convenience of description, a common description of each of the base stations 110-1 and 110-2 may be made by referring to the base station 110. In the present disclosure, a situation in which two base stations share a frequency band is described as an example, but embodiments described below may be applied even to three or more base stations.

Referring to FIG. 1, the base stations 110-1 and 110-2 are network infrastructures providing wireless access to a terminal 120. The base station 110 has coverage that is defined as a certain geographic area based on a distance to which the base station is capable of transmitting a signal. Hereinafter, the term 'coverage' used may refer to a service coverage area in the base station 110. The base station 110 may cover one cell or may cover multiple cells. Here, the multiple cells may be divided by a supported frequency and a covered sector area.

In addition to the base station, the base station 110 may be referred to as an 'access point (AP)', an 'eNodeB', a '5th generation node (5G node)', a '5G NodeB (NB)', a 'next generation node B (gNB)', a 'wireless point', a 'transmission/reception point (TRP)', a 'central unit (CU)', a 'distributed unit (DU)', a 'radio unit (RU)', a 'remote radio head (RRH)', or other terms having an equivalent technical meaning. According to various embodiments, the base station 110 may be connected to one or more 'transmission/reception points (TRPs)'. The base station 110 may transmit a downlink signal to or receive an uplink signal from the terminal 120, through the one or more TRPs.

The terminal 120, a device used by a user, performs communication with the base station 110 through a wireless channel. In some cases, the terminal 120 may be operated without user's involvement. That is, at least one of the terminals 120 is a device that performs machine type communication (MTC), and may not be carried by the user. The terminal 120 may be referred to as 'user equipment (UE)', a 'mobile station', a 'subscriber station', 'customer premises equipment' (CPE), a 'remote terminal', a 'wireless terminal', an 'electronic device', or a 'vehicle terminal', a 'user device' or other terms having an equivalent technical meaning.

A communication node (e.g., a terminal, a base station, and an entity of a core network) of various embodiments of the present disclosure may operate in an LTE system. Also, the communication node (e.g., the terminal, the base station, and the entity of the core network) of the various embodiments of the present disclosure may operate in an NR system. Also, the communication node (e.g., the terminal, the base station, and the entity of the core network) of the various embodiments of the present disclosure may operate in both the LTE system and the NR system.

In order to support network function virtualization and/or more efficient resource management and scheduling according to the introduction of the 5G system, the base station (e.g., gNB) providing a wireless network interface to user equipment (UE) may be more divided into a central unit (CU) and a distributed unit (DU). The CU has at least a radio resource control (RRC) and a packet data convergence protocol (PDCP) layer, and may include a service data adaptation protocol (SDAP) as well. The DU has a radio link control protocol (RLC), a medium access control (MAC), a physical layer, and the like. There is a standardized public interface (F1) between the CU and the DU. The F1 interface is distinguished into a control plane (F1-C) and a user plane (F1-U). A transport network layer of the F1-C is based on IP transport. In order to transmit signaling more stably, a stream control transmission protocol (SCTP) is added on a top of an Internet protocol (IP). An application layer protocol is F1AP. The SCTP may provide stable application layer messaging. A transport layer of the F1-U is a user datagram protocol (UDP)/IP. A general packet radio service (GPRS) tunneling protocol (GTP)-U is used over the UDP/IP in order to perform user plane protocol data units (PDUs).

In the present disclosure, base stations in a radio access network may include a cell (or carrier) supporting all of the same or heterogeneous RATs. In other words, the base stations support a dynamic spectrum sharing (DSS) technique in which spectrum is shared between the same or heterogeneous RATs. Hereinafter, in the present disclosure, cells sharing the spectrum, that is to say, sharing a frequency band of a specified range (some carrier frequencies are made available to both nodes (e.g., an eNB of LTE/a gNB of NR) may be referred to as sharing cells or shared cells. Examples of a wireless communication environment including a base station (e.g., CU-DU) in a distributed deployment for DSS are described through FIG. 2A to FIG. 2B.

Figure 2A:
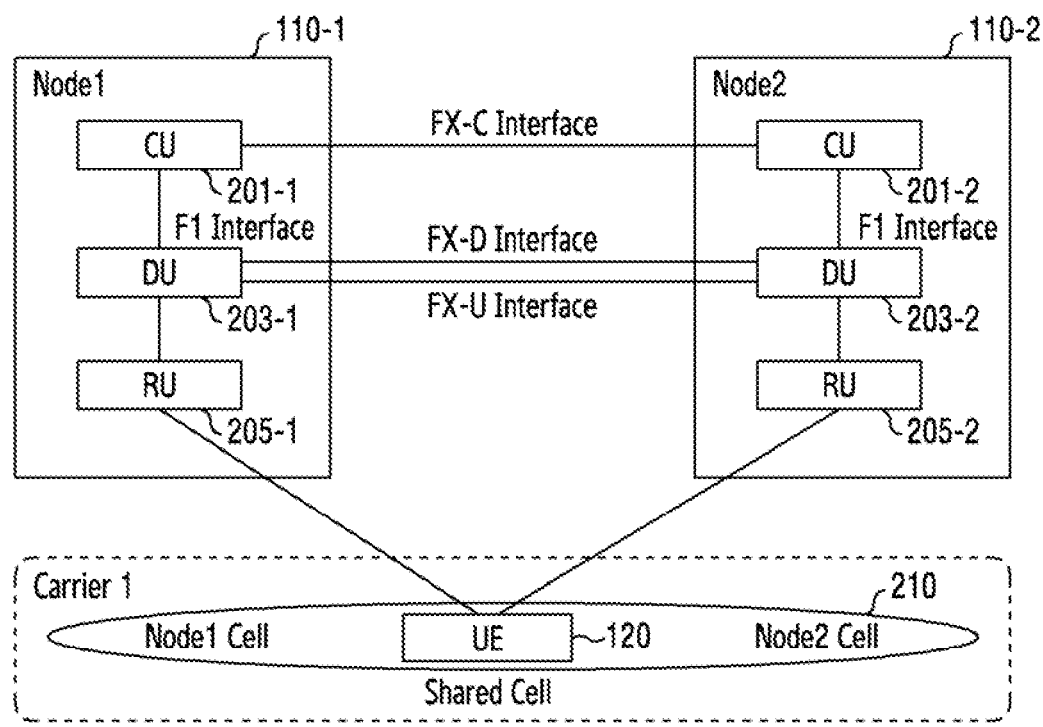
FIG. 2A and FIG. 2B illustrate examples of spectrum sharing in a wireless communication system according to various embodiments of the present disclosure.
Figure 2B:
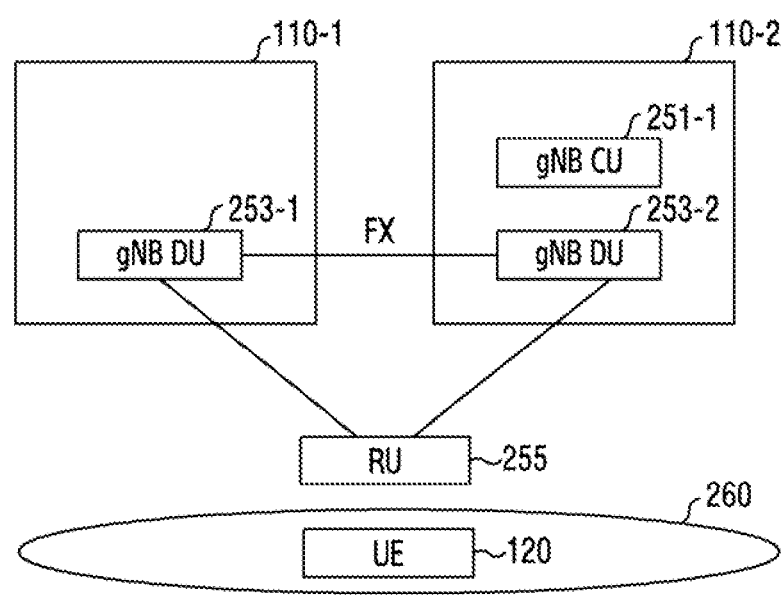

FIG. 2A and FIG. 2B illustrate examples of spectrum sharing in a wireless communication system according to various embodiments of the present disclosure. A first node 110-1 illustrates the base station 110-1 of FIG. 1. A second node 110-2 illustrates the base station 110-2 of FIG. 1.

In the related art, in a communication system having a relatively large cell radius of a base station, each base station has been installed where each base station includes functions of a digital processing unit or digital unit (DU) and a radio frequency (RF) processing unit or radio unit (RU). However, as a high frequency band is used in 4th generation (4G) and/or post communication systems, and a cell radius of the base station becomes smaller, the number of base stations for covering a specific area has increased, and a burden of installation costs of operators for installing the increased base station has increased. In order to minimize the installation cost of the base station, a structure has been proposed in which the DU and the RU of the base station are separated, and one or more RUs are connected to one DU through a wired network, and one or more RUs geographically distributed to cover a specific area are deployed. The base station may be separated into a digital unit (DU) and a radio unit (RU), and a front panel for communication between the DU and the RU is defined, and transmission over a front haul is required.

CU-DU function separation may be applied even in a base station of a type including a front haul. The base station may be implemented as a distributed deployment that is based on a centralized unit (CU) configured to perform a function of an upper layer (e.g., packet data convergence protocol (RRC)) of an access network and a distributed unit (DU) configured to perform a function of a lower layer. In this case, the distributed unit (DU) may include the aforementioned digital unit (DU) and radio unit (RU). Between a core (e.g., 5G core (5GC) or next generation core (NGC)) network and a radio network (RAN), the base station may be implemented in a structure in which CUs, DUs, and RUs are arranged in order. An interface between the CU and the distributed unit (DU) may be referred to as an F1 interface.

The centralized unit (CU) may be connected to one or more DUs, and take charge of a function of a higher layer than the DU. For example, the CU may take charge of functions of a radio resource control (RRC) and a packet data convergence protocol (PDCP) layer, and the DU and the RU may take charge of a function of a lower layer. The DU performs some functions (high PHY) of radio link control (RLC), media access control (MAC), and physical (PHY) layers, and the RU may take charge of remaining functions (low PHY) of the PHY layer. Also, as an example, the digital unit (DU) may be included in the distributed unit (DU) according to the implementation of the distributed deployment of the base station.

Referring to FIG. 2A, the first node 110-1 may include a first CU 201-1, a first DU 203-1, and a first RU 205-1. The second node 110-2 may include a second CU 201-2, a second DU 203-2, and a second RU 205-2. The first node 110-1 may provide a first cell to a UE 120. The second node 110-2 may provide a second cell to the UE 120. In this case, the first cell and the second cell may include the same frequency band (i.e., shared carrier). That is, the first cell and the second cell may be a cell 210 shared by two base stations from the standpoint of the UE 120. Here, including the same carrier frequency may mean that absolute frequency positions used are the same. The first CU 201-1 of the first node and the second CU 201-2 of the second node may perform communication through an FX-C interface. The first DU 203-1 of the first node and the second DU 203-2 of the second node may perform communication through an FX-D interface or an FX-U interface for a user plane.

FIG. 2A illustrates a situation in which independent base stations include each CU, DU, and RU, and independent RUs present serving cells to the UE, but embodiments of the present disclosure are not limited thereto. According to an embodiment, as in FIG. 2B, a scenario for presenting a service of 5G NR by using a carrier frequency defined in an eNB of LTE may also be considered.

Referring to FIG. 2B, the first node 110-1 may include an eNB DU 253-1. The eNB DU 253-1 of the first node 110-1 may be connected to an RU 255. The RU 255 is an eNB RU, and may perform a function as a part of the first node 110-1. The second node 110-2 may include a gNB-CU 251-2 and a gNB DU 253-2. The gNB DU 253-2 of the second node 110-2 may be connected to the RU 255. The second node 110-2 may perform communication with the first node 110-1 through an FX interface. For example, communication between the eNB DU 253-1 and the gNB DU 253-2 may be performed through the FX interface. A gNB-CU and gNB DU for an NR are additionally connected in the existing LTE base station, whereby the RU 255 may provide an NR cell as well as an LTE cell to the UE although they are the same carrier frequency (260). A base station (e.g., the node 110-1) may flexibly allocate spectrum in low, medium, and high frequency bands to the UE 120 through dynamic switching between an LTE and a 5G NR according to traffic demand. According to the flexible spectrum allocation, high communication performance and stable communication range may be provided to the UE 120.

Various embodiments of the present disclosure may include signaling that uses a communication interface between CUs of two nodes or a communication interface between DUs, for smooth spectrum sharing. At this time, in FIG. 2A to FIG. 2B, a structure in which a DU and an RU are separated has been exemplarily described in order to describe an implementation scenario of spectrum sharing, but the separated structure is only one aspect of implementation, and does not limit embodiments of the present disclosure. That is, a situation in which a distributed unit (DU) directly provides a cell to a UE without separation of a digital unit (DU) and a radio unit (RU) may also be understood as an embodiment of the present disclosure. Also, in FIG. 2A to FIG. 2B, each node and entity are illustrated as an independent construction in order to explain a spectrum sharing scenario, but this is only an example for explaining functional separation, and this illustration is not construed as limiting embodiments of the present disclosure. Each entity may be a physically independent device, or may be the form of software implemented to perform other functions.

The aforementioned functions and implementation examples between the nodes for spectrum sharing have been described through FIG. 2A to FIG. 2B. Hereinafter, procedures in respective nodes for spectrum sharing are described through FIG. 3A to FIG. 3B.

Figure 3A:
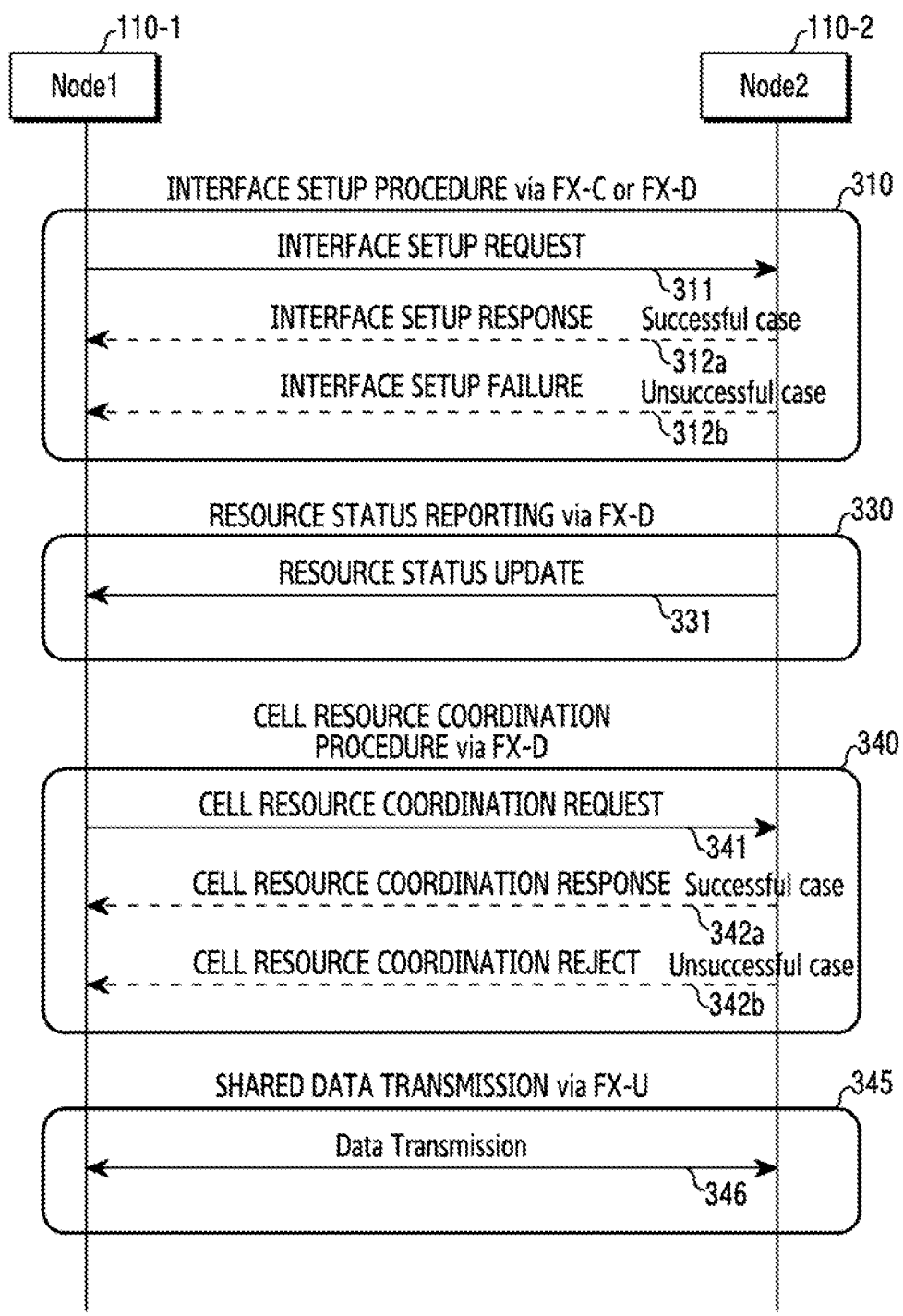
FIG. 3A and FIG. 3B illustrate examples of signaling for spectrum sharing in a wireless communication system according to various embodiments of the present disclosure.
Figure 3B:
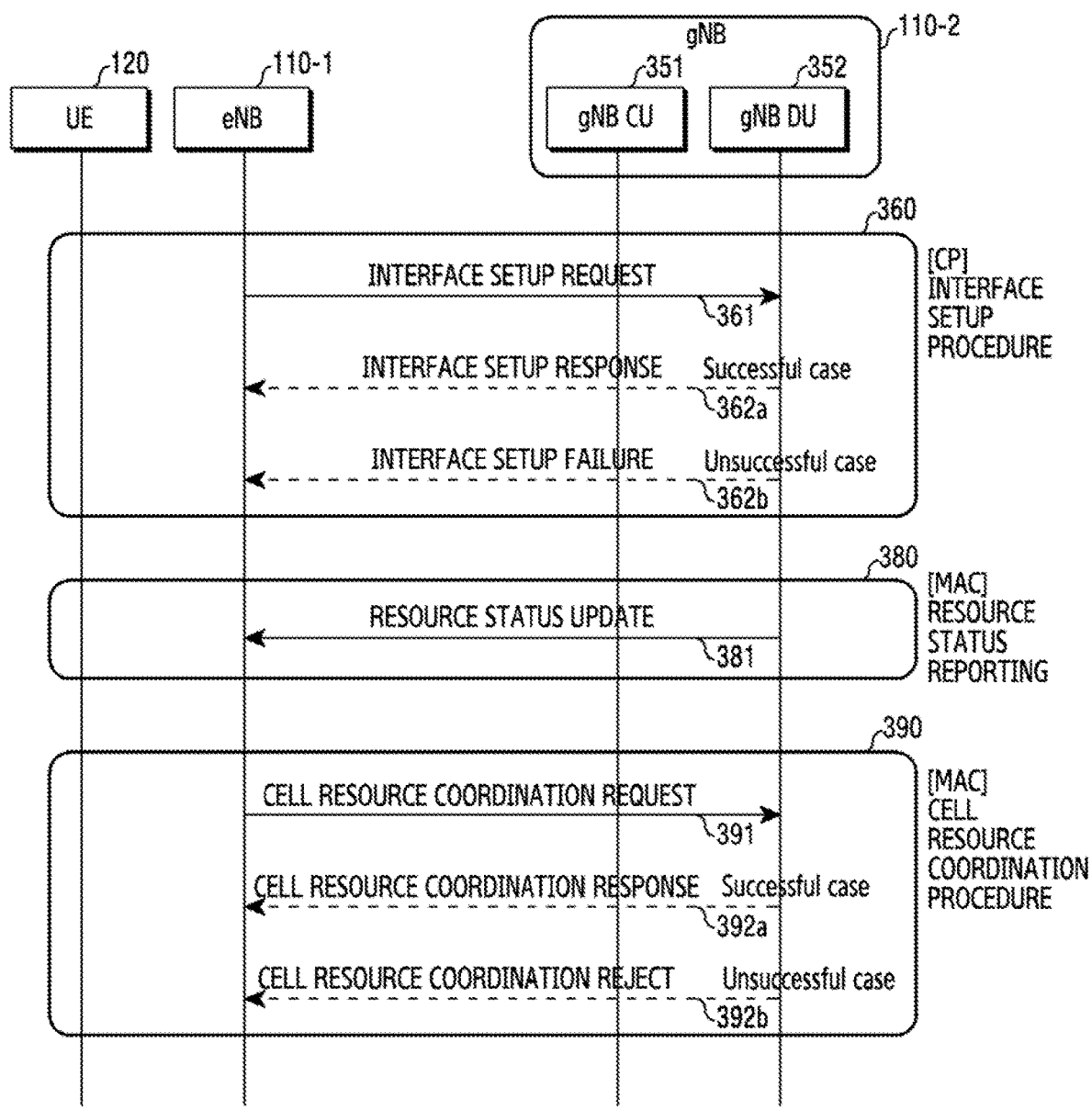

FIG. 3A and FIG. 3B illustrate examples of signaling for spectrum sharing in a wireless communication system according to various embodiments of the present disclosure. A first node 110-1 exemplifies the base station 110-1 of FIG. 1. A second node 110-2 exemplifies the base station 110-2 of FIG. 1.

Referring to FIG. 3A, signaling for spectrum sharing between two nodes is described. Signaling for configuring spectrum sharing may include an interface setup procedure 310, a resource status reporting procedure 330, a resource coordination procedure 340, and a data transmission procedure 345.

The interface setup procedure 310 may include a request procedure and a response procedure by the first node 110-1 and the second node 110-2. Signaling between the two nodes may be performed by an inter-CU interface (e.g., FX-C) or an inter-DU interface (e.g., FX-D). In step 311, the first node 110-1 may transmit an interface setup request to the second node 110-2. The second node 110-2 may determine whether to accept the interface setup request. When the interface setup request is successful, in step 312a, the second node 110-2 may transmit an interface setup response to the first node 110-1. When the interface setup request fails, in step 312b, the second node 110-2 may transmit an interface setup failure to the first node 110-1.

The resource status reporting procedure 330 may include a resource status reporting procedure by the second node 110-2. Signaling from the second node 110-2 to the first node 110-1 may be performed by an inter-DU interface (e.g., FX-D). In step 331, the second node 110-2 may transmit a resource status update message to the first node 110-1.

The resource coordination procedure 340 may include a request procedure and a response procedure by the first node 110-1 and the second node 110-2. Signaling between the two nodes may be performed by an inter-DU interface (e.g., FX-D). In step 341, the first node 110-1 may transmit a cell resource coordination request to the second node 110-2. The cell resource coordination request may be a message for requesting cell resource coordination. The second node 110-2 may determine whether to accept the cell resource coordination request. When the cell resource coordination request is successful, in step 342a, the second node 110-2 may transmit a cell resource coordination response to the first node 110-1. When the cell resource coordination request fails, in step 342b, the second node 110-2 may transmit a cell resource coordination reject to the first node 110-1.

The data transmission procedure 345 may include a data transmission procedure by the first node 110-1 and the second node 110-2. Signaling between the two nodes may be performed by an inter-DU interface (e.g., FX-U). In step 346, the first node 110-1 may transmit data to a DU of the second node 110-2 via a DU. The second node 110-2 may transmit data to a DU of the first node 110-1 via the DU.

In FIG. 3A, signaling between independent nodes has been described. As an aspect of the procedures shown in FIG. 3A for dynamic spectrum sharing, a scenario for providing a service of 5G NR by using a carrier frequency defined in an eNB of LTE as shown in FIG. 3B may be considered. Referring to FIG. 3B, as in FIG. 3A, signaling for configuring spectrum sharing may include an interface setup procedure 360, a resource status reporting procedure 380, and a resource coordination procedure 390. In this case, a first node 110-1 exemplifies an eNB, and a second node 110-2 exemplifies a gNB. The gNB 110-2 may include a gNB CU 351 and a gNB DU 352.

The interface setup procedure 360, the resource status reporting procedure 380, and the resource coordination procedure 390 of FIG. 3B may correspond to the interface setup procedure 310, the resource status reporting procedure 330, and the resource coordination procedure 380 of FIG. 3A, respectively.

The interface setup procedure 360 may include a request procedure and a response procedure by the eNB 110-1 and the gNB DU 352. In step 361, the eNB 110-1 may transmit an interface setup request to the gNB DU 352. The gNB 110-2 may determine whether to accept the interface setup request. When the interface setup request is successful, in step 362a, the gNB DU 352 may transmit an interface setup response to the eNB 110-1. When the interface setup request fails, in step 362b, the gNB DU 352 may transmit an interface setup failure to the eNB 110-1.

The resource status reporting procedure 380 may include a resource status update procedure by the gNB DU 352. In step 381, the gNB DU 352 may transmit a resource status update message to the eNB 110-1.

The resource coordination procedure 390 may include a request procedure and a response procedure by the eNB 110-1 and the gNB DU 352. In step 391, the eNB 110-1 may transmit a cell resource coordination request to the gNB DU 352. The cell resource coordination request may be a message for requesting cell resource coordination. The gNB DU 352 may determine whether to accept the cell resource coordination request. When the cell resource coordination request is successful, in step 392a, the gNB DU 352 may transmit a cell resource coordination response to the eNB 110-1. When the cell resource coordination request fails, in step 392b, the gNB DU 352 may transmit a cell resource coordination reject to the eNB 110-1.

Although all the procedures are illustrated as being performed by the gNB DU 352 in FIG. 3B, embodiments of the present disclosure are not limited thereto. Some of the procedures may be performed by the gNB CU 351 as well. According to an embodiment, the resource status reporting procedure and the resource coordination procedure may be performed by the gNB DU 352 and the eNB 110-1, and the interface setup procedure may be performed by the gNB CU 351 and the eNB 110-1.

Through FIG. 3A to FIG. 3B, the procedures between the two nodes supporting the same or heterogeneous RATs for the spectrum sharing have been described. Hereinafter, examples of specific information included in signaling of each procedure will be described with reference to FIG. 4 to FIG. 7.

Interface Setup Procedure

Figure 4:
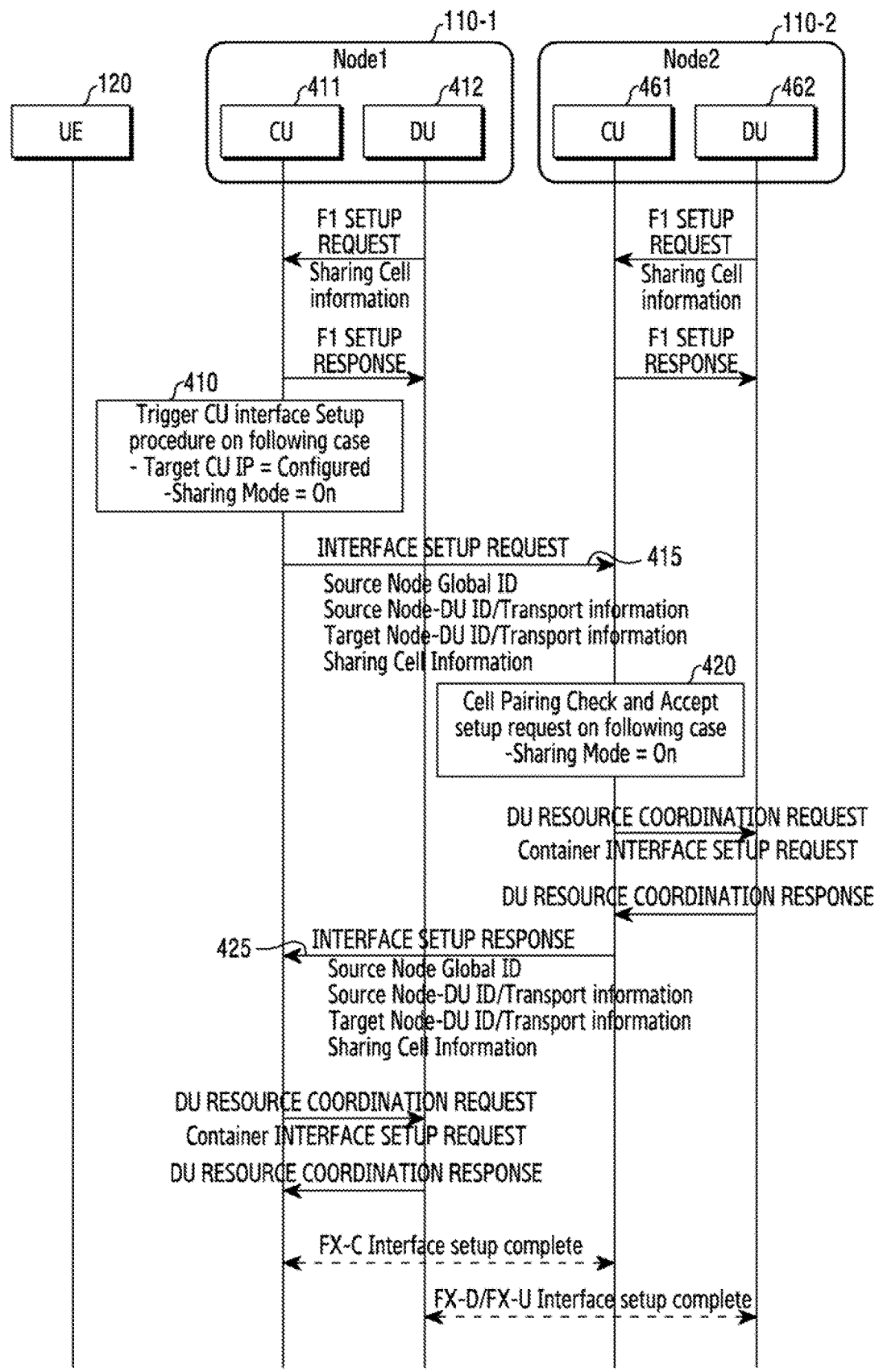
FIG. 4 illustrates an example of a central unit (CU)-initiated interface setup procedure in a wireless communication system according to various embodiments of the present disclosure.

FIG. 4 illustrates an example of a central unit (CU)-initiated interface setup procedure in a wireless communication system according to various embodiments of the present disclosure. A first node 110-1 exemplifies the base station 110-1 of FIG. 1. The first node 110-1 may include a first CU 411 and a first DU 412. A second node 110-2 exemplifies the base station 110-2 of FIG. 1. The second node 110-2 may include a second CU 461 and a second DU 462. Each function may be implemented as an independent entity or be implemented as a separate function within one entity.

Referring to FIG. 4, in step 410, the first CU 411 may configure a target CU IP, and turn on a sharing mode. In some embodiments, an F1 setup procedure may be performed in each node before an interface setup procedure. The setup procedure for an F1 interface between a CU and a DU of each node may be performed. In this case, the DU may forward sharing cell information to the CU. Then, by configuring the target CU IP, the interface setup procedure is initiated. Hereinafter, the setup procedure initiated by the first CU 411 of the first node 110-1 will be described.

In step 415, the first CU 411 may transmit an interface setup request to the second CU 461. The interface setup request may correspond to the interface setup request of step 311 of FIG. 3A. The interface setup request may include at least one of an ID (e.g., a global ID) of a source node, DU ID and transport information of the source node, DU ID and transport information of a target node, a shared node ID, and sharing cell information. Here, the transport information may include at least one of an IP address for setting up an FX-D interface between the DUs, a port number for setting up the FX-D interface, or an IP address for setting up an FX-U interface between the DUs. In an example, the source node may be the first node 110-1, and the target node may be the second node 110-2.

The sharing cell information of embodiments of the present disclosure may include a cell ID (e.g., a cell global identity (CGI) and/or a physical cell identity (PCI)) for spectrum sharing or a channel number (e.g., an absolute radio frequency channel number (ARFCN), an evolved universal mobile telecommunications system (UMTS) terrestrial radio access (E-UTRA) ARFCN (EARFCN), and new radio (NR)-ARFCN. Also, the sharing cell information of embodiments of the present disclosure may include cell transport information. In an example, the cell transport information may include a cell port number. Also, the sharing cell information of the embodiments of the present disclosure may include resource information. The resource information may include at least one of data resource information (e.g., physical uplink shared channel (PUSCH) resource pattern information), control channel information (e.g., physical downlink control channel (PDCCH) length information), resource allocation information (e.g., RB blanking information), and RS (reference signal) configuration information (e.g., positioning RS (PRS) configuration information and cell-specific RS (CRS) configuration information). Also, the sharing cell information of the embodiments of the present disclosure may include target cell information. For example, the target cell may be indicated by a CGI or a PCI. In addition, the sharing cell information of the embodiments of the present disclosure may include a sharing cell ID. By forwarding the sharing cell information to the second CU 461, the first CU 411 may forward the interface setup request for DSS.

In step 420, the second CU 461 may perform a cell pairing check, and accept the interface setup request. Here, cell pairing may refer to a procedure of associating two cells for spectrum sharing. This is because the spectrum sharing requires that cells be located within a common frequency range. The second CU 461 may verify whether the cells of the nodes may be paired for the spectrum sharing, and when the verification succeeds, the second CU 461 may accept the interface setup request. The second CU 461 may turn on a sharing mode. Thereafter, the second CU 461 may forward the interface setup request received from the first CU 411, to the second DU 462. According to an embodiment, the second CU 461 may forward the interface setup request to the second DU 462 by using a container. For example, the second CU 461 may include the interface setup request received from the first CU 411, as it is, in a DU resource coordination request, by using a container IE of the DU resource coordination request. According to another embodiment, the second CU 461 may provide a separate DU resource coordination request by using information obtained from the interface setup request received from the first CU 411. After forwarding the resource coordination request, the second CU 461 may receive a DU resource coordination response from the second DU 462.

In step 425, the second CU 461 may transmit an interface setup response to the first CU 411. The interface setup response may include at least one of an ID (e.g., a global ID) of a source node, DU ID and transport information of the source node, DU ID and transport information of a target node, a shared node ID, and sharing cell information. A description of each piece of information may be applied identically or similarly to step 415. In an example, the source node may be the second node 110-2, and the target node may be the first node 110-1.

The interface setup response may correspond to the interface setup response of step 312a of FIG. 3A. Thereafter, the first CU 411 may forward the interface setup response received from the second CU 461 to the first DU 412. According to an embodiment, the first CU 411 may forward the interface setup response to the first DU 412 by using a container. For example, the first CU 411 may include the interface setup response received from the second CU 461, as it is, in a DU resource coordination request, by using a container IE of the DU resource coordination request. According to another embodiment, the first CU 411 may provide a separate DU resource coordination request by using information obtained from the interface setup response received from the second CU 461. After forwarding the resource coordination request, the first CU 411 may receive a DU resource coordination response from the first DU 412.

Through the above-described procedures, an FX-C interface setup procedure between the first CU 411 and the second CU 461 may be completed. Also, an FX-D interface setup procedure and/or an FX-U interface setup procedure between the second DU 412 and the second DU 462 may be completed.

Although the both nodes are illustrated as having the CU and the DU in FIG. 4, according to an embodiment, one node may be implemented as a single entity (e.g., eNB) without CU-DU separation. In the corresponding node, the F1 interface setup procedure between the CU and the DU and the resource coordination procedure between the CU and the DU may be omitted.

Figure 5:
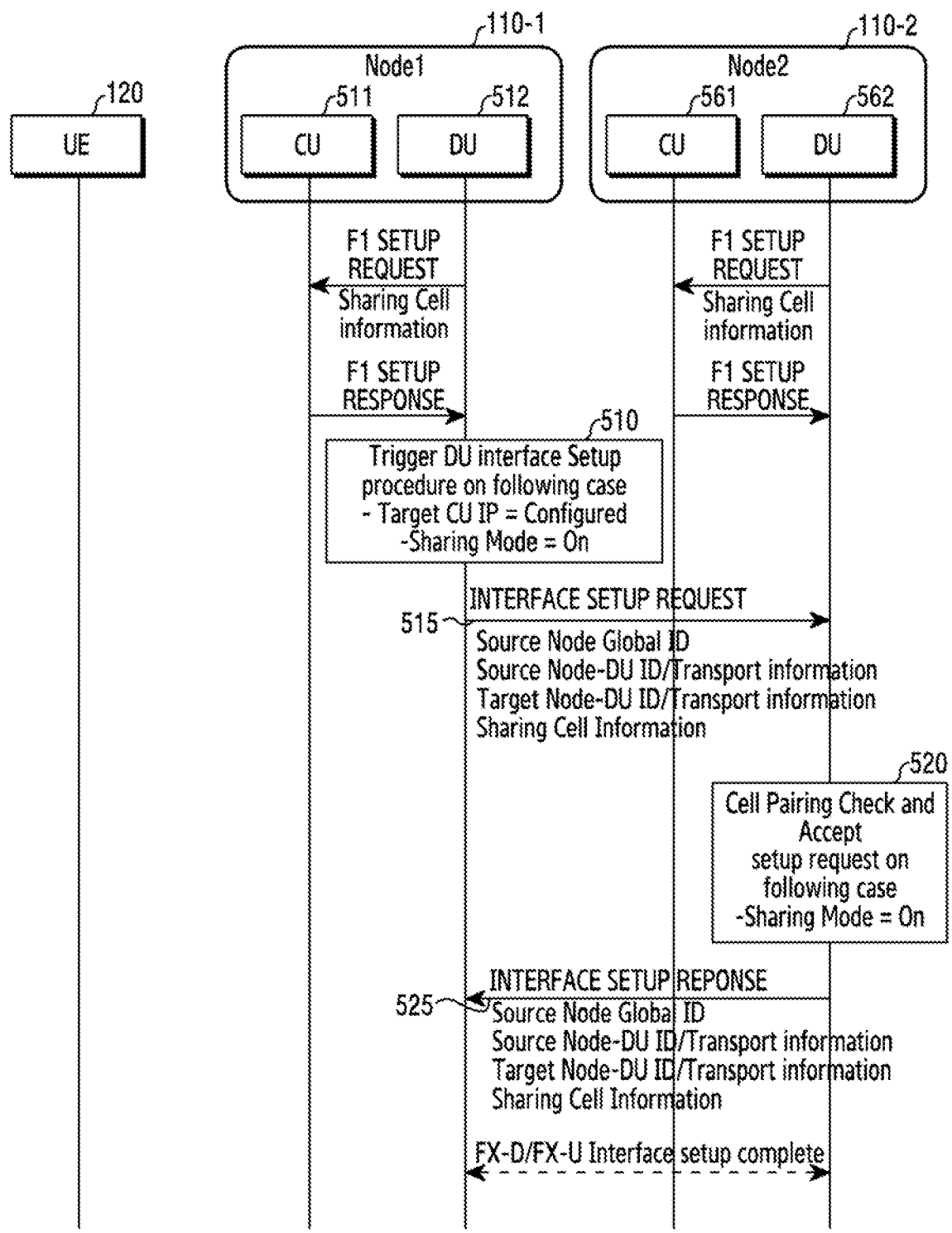
FIG. 5 illustrates an example of a distributed unit (DU)-initiated interface setup procedure in a wireless communication system according to various embodiments of the present disclosure.

FIG. 5 illustrates an example of a distributed unit (DU)-initiated interface setup procedure in a wireless communication system according to various embodiments of the present disclosure. A first node 110-1 exemplifies the base station 110-1 of FIG. 1. The first node 110-1 may include a first CU 511 and a first DU 512. A second node 110-2 exemplifies the base station 110-2 of FIG. 1. The second node 110-2 may include a second CU 561 and a second DU 562. Each function may be implemented as an independent entity or be implemented as a separate function within one entity.

Referring to FIG. 5, in step 510, the first DU 512 may configure a target DU IP and turn on a sharing mode. In some embodiments, an F1 setup procedure may be performed in each node before an interface setup procedure. The setup procedure for an F1 interface between a CU and DU of each node may be performed. In this case, the DU may forward sharing cell information to the CU. Thereafter, by configuring the target DU IP, the interface setup procedure is initiated. Hereinafter, the setup procedure initiated by the first DU 512 of the first node 110-1 will be described.

In step 515, the first DU 512 may transmit an interface setup request to the second DU 562. The interface setup request may correspond to the interface setup request of step 311 of FIG. 3A. The interface setup request may include at least one of an ID (e.g., a global ID) of a source node, DU ID and transport information of the source node, DU ID and transport information of a target node, a shared node ID, and sharing cell information. Here, the transport information may include at least one of an IP address for setting up an FX-D interface between DUs, a port number for setting up the FX-D interface, or an IP address for setting up an FX-U interface between DUs. In an example, the source node may be the first node 110-1, and the target node may be the second node 110-2.

The sharing cell information of embodiments of the present disclosure may include a cell ID (e.g., a cell global identity (CGI) and/or a physical cell identity (PCI)) for spectrum sharing or a channel number (e.g., absolute radio frequency channel number (ARFCN), E-UTRA ARFCN (EARFCN), and/or new radio (NR)-ARFCN). Also, the sharing cell information of embodiments of the present disclosure may include cell transport information. In an example, the cell transport information may include a cell port number. Also, the sharing cell information of the embodiments of the present disclosure may include resource information. The resource information may include at least one of data resource information (e.g., physical uplink shared channel (PUSCH) resource pattern information), control channel information (e.g., physical downlink control channel (PDCCH) length information), resource allocation information (e.g., RB blanking information), and/or reference signal (RS) configuration information (e.g., positioning RS (PRS) configuration information and/or cell-specific RS (CRS) configuration information). Also, the sharing cell information of the embodiments of the present disclosure may include target cell information. For example, a target cell may be indicated by a CGI or a PCI. Also, the sharing cell information of the embodiments of the present disclosure may include a sharing cell ID. By forwarding the sharing cell information to the second DU 562, the first DU 512 may forward the interface setup request for DSS.

In step 520, the second DU 562 may perform a cell pairing check, and accept the interface setup request. The second DU 562 may turn on the sharing mode. Unlike FIG. 4, since the sharing cell information is directly received through an inter-DU interface, a subsequent procedure may be performed without an inter-CU-DU additional procedure.

In step 525, the second DU 562 may transmit an interface setup response to the first DU 512. The interface setup response may include at least one of an ID (e.g., a global ID) of a source node, DU ID and transport information of the source node, DU ID and transport information of a target node, a shared node ID, and sharing cell information. A description of each piece of information may be applied identically or similarly to step 415. In an example, the source node may be the second node 110-2, and the target node may be the first node 110-1.

The interface setup response may correspond to the interface setup response of step 312a of FIG. 3A. Unlike FIG. 4, as the sharing cell information is directly received through the inter-DU interface, the inter-CU-DU additional procedure may not be performed any more. Through the above-described procedures, an FX-D interface setup procedure and/or an FX-U interface setup procedure between the first DU 512 and the second DU 562 may be completed.

Although the both nodes are illustrated as having the CU and the DU in FIG. 5, according to an embodiment, one node may be implemented as a single entity (e.g., eNB) without CU-DU separation. In the corresponding node, the F1 interface setup procedure between the CU and the DU may be omitted. Hereinafter, as this example, a situation in which an LTE cell and an NR cell are shared is described.

Assume a dynamic spectrum sharing situation performed by an eNB and a gNB. When it is initiated by the gNB, the gNB may perform an interface setup procedure for a neighbor node IP. DSS cell information may be shared between a DU of the gNB and the eNB. The DU of the gNB may transmit an interface setup request to the eNB. The gNB DU may transmit, to the eNB, the interface setup request that includes at least one of a global gNB ID, a gNB DU ID, an IP address of the gNB DU, an IP address of the target eNB, an ID of the target eNB, and NR cell information for sharing. The NR cell information may include at least one of an ID of an NR cell for DSS (e.g., NR CGI), port information (e.g., UDP port-related information), target cell information (target E-UTRA Cell ID (e.g., ECGI)), NR resource information (e.g., a protected NR resource indicator), and NR tracking reference signal (TRS) information.

The eNB may determine whether to accept the interface setup request of the gNB by determining whether configuration information is normal. The eNB may perform a pairing check. Here, pairing refers to a procedure for, by associating spectrum sharing between an LTE cell and an NR cell, managing the association. Through the pairing procedure, the LTE cell of the eNB and the NR cell of the gNB may be controlled together under a DSS function. After checking the pairing procedure, the eNB may transmit a response (success/failure) to the gNB, based on paired cell information. The eNB may transmit an interface setup response to the DU of the gNB. The eNB may transmit, to the DU of the gNB, the interface setup response that includes at least one of a global eNB ID, an ID (e.g., a global ID) of the target gNB, an IP address of the eNB, and LTE cell information for sharing. The LTE cell information may include at least one of an ID (e.g., an ECGI) of an LTE cell for DSS, port information (e.g., UDP port-related information), target cell information (target NR cell ID (e.g., NR CGI)), LTE resource information (e.g., protected LTE resource indicator), and LTE CRS information.

The signaling type described above in FIG. 4 to FIG. 5 may be non-UE associated signaling (e.g., CU-associated signaling). As the sharing cell information and the transport information are forwarded to the target DU through the corresponding procedure, an interface between CUs or an interface between DUs may be set up. Also, such a signaling path/data path may be set up in the unit of one or more shared cells. Meanwhile, the above-described setup may be performed for later DSS cell increase, decrease, or setup change as well. The corresponding node may forward update information to other nodes through the setup procedure.

After the interface is set up, the two nodes may further perform a procedure (i.e., DSS interface removal) for removing the setup interface. The interface removal procedure may be performed through an inter-CU interface (e.g., FX-CU) or an inter-DU interface (FX-DU). At least one of a CU ID, a DU ID, a shared node ID, and sharing cell information for removal may be included even in a message for removal. The shared cell information may include at least one of a cell ID (e.g., a cell ID of a source node), a target cell ID (e.g., a cell ID of a target node), and a sharing cell ID (i.e., an ID defined for DSS). In this case, the cell ID may be indicated in the form of a PCI or a CGI (e.g., ECGI or NR-CGI).

The information forwarded between the two nodes in the interface setup procedure described with reference to FIG. 4 to FIG. 5 may be configured, for example, as in Table 1 below.

TABLE 1

| Message name | Interface | Transmission unit | Information elements |
|---|---|---|---|
| INTER-FACE SETUP REQUEST | FX-C or FX-D | Per CU or Per DU | Node-CU ID<br>Node-DU ID<br>Sharing Node ID<br>Node-DU Transport Information<br>Node-DU-FX-D IP Address<br>Node-DU-FX-D Port Number<br>Node-DU-FX-U IP Address<br>Target Global Node ID<br>Sharing Cell Information (To Add)<br>Cell ID (CGI, PCI), ARFCN<br>Cell Transport Information<br>Cell Port Number<br>Resource Information<br>PUSCH Resource Pattern information<br>PDCCH Length Information<br>RB Blanking information<br>PRS configuration information<br>CRS configuration information<br>Target Cell ID (CGI, PCI)<br>Sharing Cell ID |
| INTER-FACE SETUP RESPONSE | FX-C or FX-D | Per CU or Per DU | Node-CU ID<br>Node-DU ID<br>Sharing Node ID<br>Node-DU Transport Information<br>Node-DU-FX-D IP Address<br>Node-DU-FX-D Port Number<br>Node-DU-FX-U IP Address<br>Target Global Node ID<br>Sharing Cell Information (To Add)<br>Cell ID (CGI, PCI), ARFCN<br>Cell Transport Information<br>Cell Port Number<br>Resource Information<br>PUSCH Resource Pattern information<br>PDCCH Length Information<br>RB Blanking information<br>PRS configuration information<br>CRS configuration information<br>Target Cell ID (CGI, PCI)<br>Sharing Cell ID |
| INTER-FACE SETUP FAILURE | FX-C or FX-D | Per CU or Per DU | Cause (Function Off, Static Mode operated, Dynamic mode operated, Unknown Cell, Unknown xNB, configuration mismatch . . . ) |
| DSS INTER-FACE REMOVAL | FX-C or FX-D | Per CU or Per DU | Node-CU ID Node-DU ID<br>Sharing Node ID<br>Sharing Cell Information (To Delete)<br>Cell ID (CGI, PCI)<br>Target Cell ID (CGI, PCI)<br>Sharing Cell ID |

Resource Coordination Procedure

Figure 6:
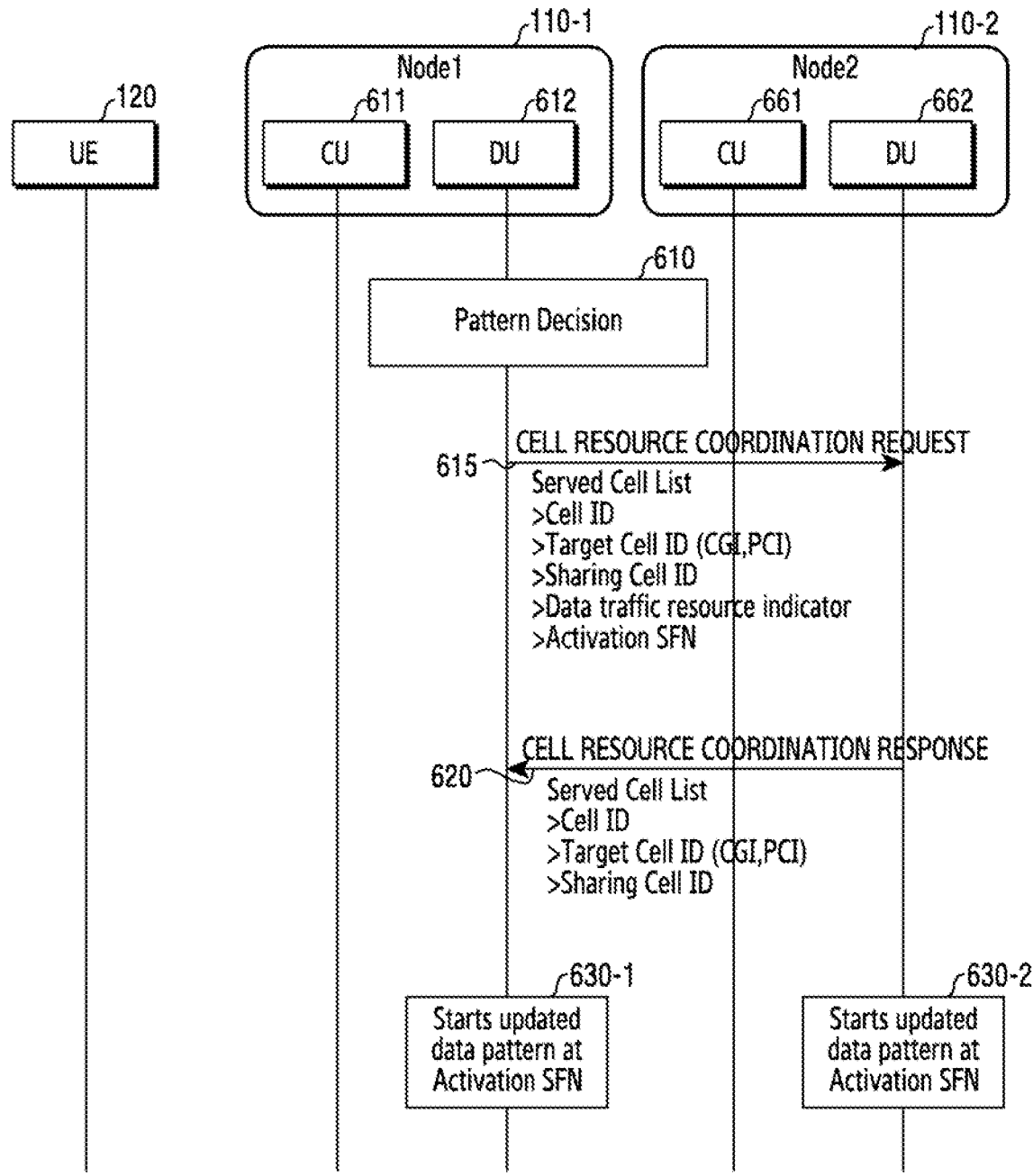
FIG. 6 illustrates an example of a resource coordination procedure for spectrum sharing in a wireless communication system according to various embodiments of the present disclosure.

FIG. 6 illustrates an example of a resource coordination procedure for spectrum sharing in a wireless communication system according to various embodiments of the present disclosure. A first node 110-1 exemplifies the base station 110-1 of FIG. 1. The first node 110-1 may include a first CU 611 and a first DU 612. A second node 110-2 exemplifies the base station 110-2 of FIG. 1. The second node 110-2 may include a second CU 661 and a second DU 662. Each function may be implemented as an independent entity or be implemented as a separate function within one entity.

Referring to FIG. 6, in step 610, the first DU 612 may determine a resource pattern. A resource coordination procedure may be used to express resource allocation desired for data traffic transmission. The resource coordination procedure may include signaling for indicating the coordination of an allocated or to-be-allocated resource. The first DU 612 may determine the resource pattern according to a current resource status, and identify a target node or a target cell. Thereafter, the first DU 612 may provide a resource coordination request including the resource pattern, the target node, and the target cell. Here, the resource pattern may mean a resource distribution state between shared cells. For example, the resource pattern may include information related to a resource ratio between two cells. Also, for example, the resource pattern may include information related to a weight of each of the two cells. Also, for example, the resource pattern may include information related to a cell load of each of the two cells. According to an embodiment, in the case of inter-LTE-NR spectrum sharing, one (e.g., eNB) of the two nodes may determine pattern information, based on an LTE resource status and an NR resource status.

In step 615, the first DU 612 may transmit a cell resource coordination request to the second DU 662. The cell resource coordination request may include a served cell list. Here, the list is only one form of data, and such description is not construed as limiting the embodiment of the present disclosure. The served cell list may include information on one or more cells served by the first DU 612. The serving cell list may include at least one of a cell ID, a target cell ID, a sharing cell ID, a data traffic resource indicator, and an activation single frequency network (SFN). Each cell ID may be indicated in the form of a PCI or a CGI. Also, the target cell may refer to a cell of the target node (e.g., the second DU 662). According to an embodiment, in the case of inter-LTE-NR spectrum sharing, when the first node 110-1 is an eNB and the second node 110-2 is a gNB, the eNB may forward an E-UTRA cell ID and a target NR cell ID (e.g., an NR CGI), to the gNB DU.

In step 620, the second DU 662 may transmit a cell resource coordination response to the first DU 612. The second DU 662 may determine whether to accept the cell resource coordination request. When the cell resource coordination request is accepted, the second DU 662 may transmit the cell resource coordination response to the first DU 612. The cell resource coordination response may include a served cell list. The serving cell list may include at least one of a cell ID, a target cell ID, and a sharing cell ID. Here, the list is only one form of data, and such description is not construed as limiting the embodiment of the present disclosure. Each cell ID may be indicated in the form of a PCI or a CGI. Also, a target cell may refer to a cell of the target node (e.g., the first DU 612). According to an embodiment, in the case of inter-LTE-NR spectrum sharing, when the first node 110-1 is an eNB and the second node 110-2 is a gNB, the gNB DU may forward an NR cell ID and a target E-UTRA cell ID (e.g., ECGI), to the eNB.

In step 630-1, the first DU 612 may update a corresponding data pattern at the activation SFN. In step 630-2, the second DU 662 may update the corresponding data pattern at the activation SFN. In accordance with the pattern changed with a criterion of an activation SFN time point, data transmission/resource allocation may be performed by each DU (or eNB according to an embodiment).

When the cell resource coordination request is rejected, the second DU 662 may transmit a cell resource coordination reject to the first DU 612. The cell resource coordination reject may include failed cell information. The failed cell information may include at least one of a cell ID, a target cell ID, a sharing cell ID, and a failure cause.

The signaling type described above in FIG. 6 may be non-UE associated signaling (e.g., node (DU or RU) or cell-associated signaling). As sharing cell information and resource-related information are forwarded to the target DU through the corresponding procedure, a resource status related to a shared cell may be updated.

The information forwarded between the two nodes in the resource coordination procedure described with reference to FIG. 6 may be configured, for example, as shown in Table 2 below.

TABLE 2

| Message name | Interface | Transmission unit | Information elements |
|---|---|---|---|
| CELL RESOURCE COORDINATION REQUEST | FX-D or FX-U | Per DU or Per Cell | Served Cell List Cell ID Target Cell ID (CGI, PCI) Sharing Cell ID Data Traffic Resource Indication Activation SFN |
| CELL RESOURCE COORDINATION RESPONSE | FX-D or FX-U | Per DU or Per Cell | Served Cell List Cell ID Target Cell ID (CGI, PCI) Sharing Cell ID |
| CELL RESOURCE COORDINATION REJECT | FX-D or FX-U | Per DU or Per Cell | Failed Cell List Cell ID Target Cell ID (CGI, PCI) Sharing Cell ID Cause (Function Off, Static Mode operated, Dynamic mode operated, Unknown Cell, Unknown xNB, configuration mismatch . . . ) |

Although the both nodes are illustrated as having the CU and the DU in FIG. 6, according to an embodiment, one node may be implemented as a single entity (e.g., eNB) without CU-DU separation. In this case, inter-DU signaling may be understood as signaling between the DU (e.g., a gNB DU) and another node (e.g., an eNB). As in the above-described embodiments of FIG. 6, an interface of a DU end is utilized for performing the resource coordination between the two nodes, whereby a more improved time delay resolution effect than being performed through an interface of a CU end may be presented. As the interface between the DUs and the signaling through the interface are defined, a load of each of the two shared cells (e.g., LTE cell and NR cell) is adjusted in real time and adaptively, whereby the communication performance of the UE may be maximized.

Resource Status Reporting

Figure 7:
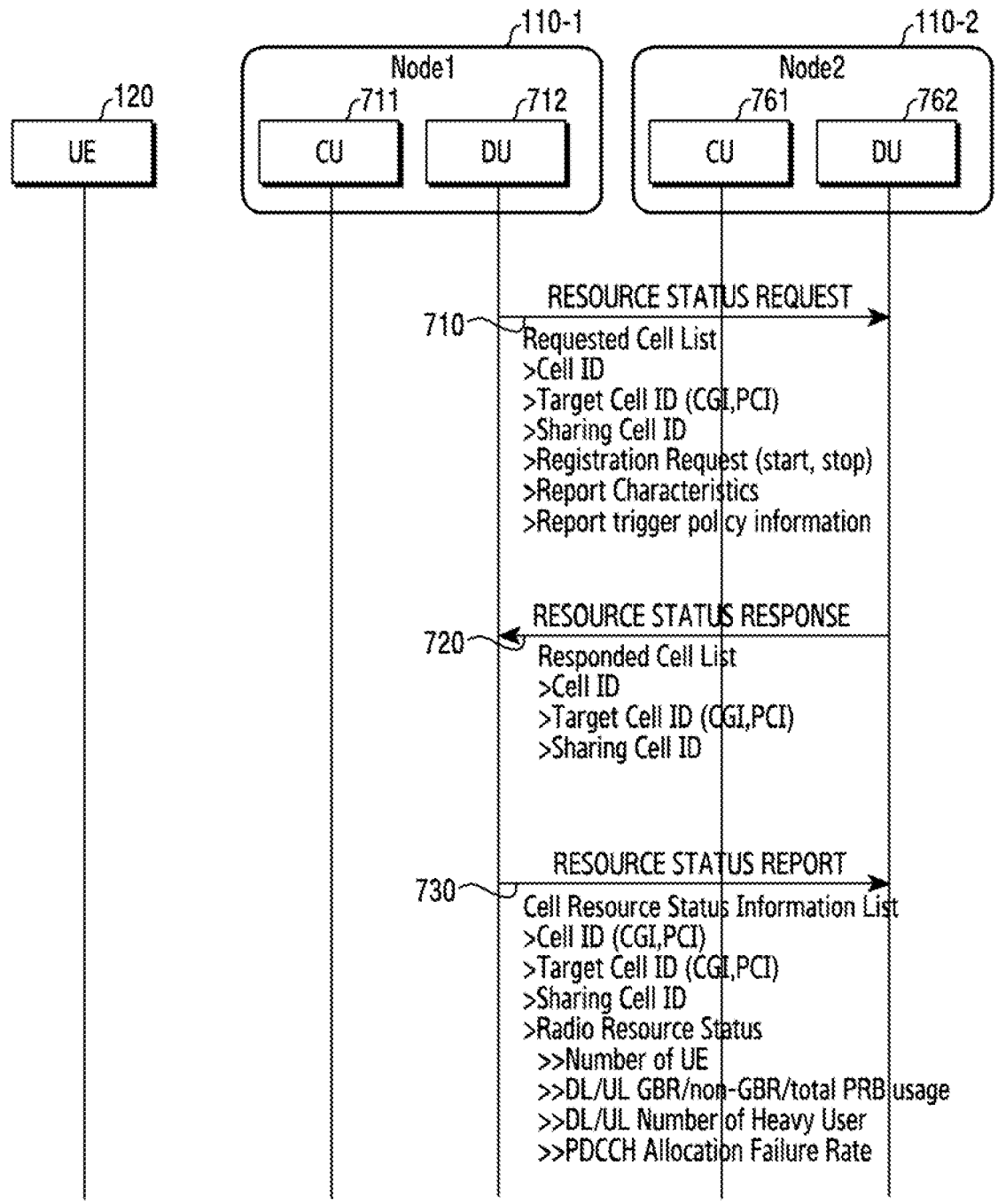
FIG. 7 illustrates an example of a resource status reporting procedure for spectrum sharing in a wireless communication system according to various embodiments of the present disclosure.

FIG. 7 illustrates an example of a resource status reporting procedure for spectrum sharing in a wireless communication system according to various embodiments of the present disclosure. A first node 110-1 exemplifies the base station 110-1 of FIG. 1. The first node 110-1 may include a first CU 711 and a first DU 712. A second node 110-2 exemplifies the base station 110-2 of FIG. 1. The second node 110-2 may include a second CU 761 and a second DU 762. Each function may be implemented as an independent entity or be implemented as a separate function within one entity.

Referring to FIG. 7, in step 710, the first DU 712 may transmit a resource status request to the second DU 762. The resource status request may include request cell information. The request cell information may include information on one or more cells that the first node 110-1 requests to the second node 110-2. The request cell information may include at least one of a cell ID, a target cell ID, a sharing cell ID, a registration request (e.g., start/stop), report characteristics, and report trigger policy information. Each cell ID may be indicated in the form of a PCI or a CGI. Also, the target cell may refer to a cell of a target node (e.g., the second DU 762).

The resource status request may be a procedure for sharing resource status information on other nodes or cells of the other nodes. According to an embodiment, the resource status request may be transmitted periodically. Whenever a periodic timer expires, the resource status request may be transmitted. According to another embodiment, when a specified event occurs, the resource status request may be transmitted. For example, the resource status request may be transmitted at the time of occurrence of an event of when a load of a current node (e.g., the first node 110-1) increases, when a problem occurs in a communication network of the current node, when the current node is being repaired, or when a shared cell of the current node is reconfigured, etc.

In step 720, the second DU 762 may transmit a resource status response to the first DU 712. The resource status response may include response cell information. The response cell information is a response of the second node 110-2 responsive to the request of the first node 110-1, and may include information on one or more cells. The response cell information may include at least one of a cell ID, a target cell ID, and a sharing cell ID. Each cell ID may be indicated in the form of a PCI or a CGI. Also, the target cell may refer to a cell of a target node (e.g., the first DU 712).

In step 730, the first DU 712 may transmit a resource status report to the second DU 762. According to an embodiment, the resource status report may include a resource status update. The resource status report may include a cell resource status information list. The cell resource status information list may include a measurement result for each cell acquired by the first DU 712. The cell resource status information list may include a cell ID, a target cell ID, a sharing cell ID, and a radio resource status of a corresponding node (e.g., the first node 110-1). Here, the list is only one form of data, and such description is not construed as limiting the embodiment of the present disclosure. The radio resource status may include at least one of the number of UEs connected to a serving cell, a guaranteed bit-rate (GBR) by downlink (DL) and/or uplink (UL), a non-GBR, a total physical resource block (PRB) usage, the number of heavy users (e.g., UEs requiring a load/speed equal to or more than a threshold value) by DL/UL, and a resource allocation failure rate (e.g., a PDCCH allocation failure rate).

According to various embodiments, a resource status reporting procedure of step 730 of FIG. 7 may also be performed on an event basis. According to an embodiment, when the PRB usage, the resource allocation failure rate, the number of heavy users, etc. exceed a threshold value or more, the gNB-DU may determine that an event occurs. In this case, the gNB-DU may transmit the resource status report to the eNB.

When the resource status request is rejected, the second DU 662 may transmit a resource status failure message to the first DU 612. The resource status failure message may include failed cell information. The failed cell information may include at least one of a cell ID, a target cell ID, a sharing cell ID, and a failure cause.

In FIG. 7, step 730 is illustrated to be performed after step 710 and step 720, but this is only an aspect of resource status reporting, and embodiments of the present disclosure are not construed as being limited by FIG. 7. That is, step 730 may be performed before steps 710 and 720, or may be performed between steps 710 and 720, or may not be performed. That is, as an example, the resource status report transmission in the resource status reporting procedure and the resource status request/response transmission may be separate procedures.

The signaling type described above in FIG. 7 may be non-UE associated signaling (e.g., node (DU or RU) or cell-associated signaling). Through the corresponding procedure, resource status information may be shared between nodes or cells. For spectrum sharing, resource information may be shared for each paired cell. Based on the resource status report, a ratio for dynamic spectrum sharing for each cell may be determined. This resource status reporting procedure may be performed, together, in conjunction with the cell resource coordination procedure of FIG. 6. According to an embodiment, after the resource status reporting procedure is performed, the cell resource coordination procedure may be performed. Also, according to an embodiment, after the cell resource coordination procedure is performed, the resource status reporting procedure may be performed. That is, the two procedures may be performed complementary to each other.

The information forwarded between the two nodes in the resource status reporting procedure described with reference to FIG. 7 may be configured, for example, as shown in Table 3 below.

TABLE 3

| Message name | Interface | Transmission unit | Information elements |
|---|---|---|---|
| RESOURCE STATUS REQUEST | FX-D or FX-U | Per DU or Per Cell | Requested Cell List<br>Cell ID<br>Target Cell ID (CGI, PCI)<br>Sharing Cell ID<br>Registration Request (start, stop)<br>Report Characteristics<br>PRB Usage, No. of Heavy UE, . . .<br>Report trigger policy information<br>Time Periodic Reporting<br>Event-based Reporting |
| RESOURCE STATUS RESPONSE | FX-D or FX-U | Per DU or Per Cell | Responded Cell List<br>Cell ID<br>Target Cell ID (CGI, PCI)<br>Sharing Cell ID |
| RESOURCE STATUS FAILURE | FX-D or FX-U | Per DU or Per Cell | Cause (Function Off, Static Mode operated, Dynamic mode operated, Unknown Cell, Unknown xNB, configuration mismatch . . . )<br>Time To Wait |
| RESOURCE STATUS REPORT | FX-D or FX-U | Per DU or Per Cell | Cell Resource Status Information List<br>Cell ID (CGI,PCI)<br>Target Cell ID (CGI,PCI)<br>Sharing Cell ID<br>Radio Resource Status<br>Number of UE<br>DL/UL GBR/non-GBR/Total PRB usage<br>DL/UL Number of Heavy User<br>PDCCH Allocation Failure Rate |

Although the both nodes are illustrated as having the CU and the DU in FIG. 7, according to an embodiment, one node may be implemented as a single entity (e.g., eNB) without CU-DU separation. In this case, inter-DU signaling may be understood as signaling between the DU (e.g., gNB DU) and another node (e.g., eNB). As in the above-described embodiments of FIG. 7, when the two nodes share a resource status of the counterpart node, an interface of a DU end is utilized, whereby a more improved time delay effect than being performed through an interface of a CU end may be presented. As the interface between the DUs and the signaling through them are defined, a load of each of the two shared cells (e.g., LTE cell and NR cell) is adjusted in real time and adaptively, whereby the communication performance of the UE may be maximized.

Conventionally, an interface for dynamic spectrum sharing did not exist. Accordingly, there is a problem in that it is impossible to provide a function at all or a time delay occurs during control signaling and data communication due to a limited interface (e.g., connection between CUs). In order to solve the problem caused by such limited operation, various embodiments of the present disclosure provide direct interface and signaling between DUs. Through this, real-time control signaling and data communication may be achieved. Also, communication performance through DSS of a UE may increase due to the resolution of the time delay.

Figure 8:
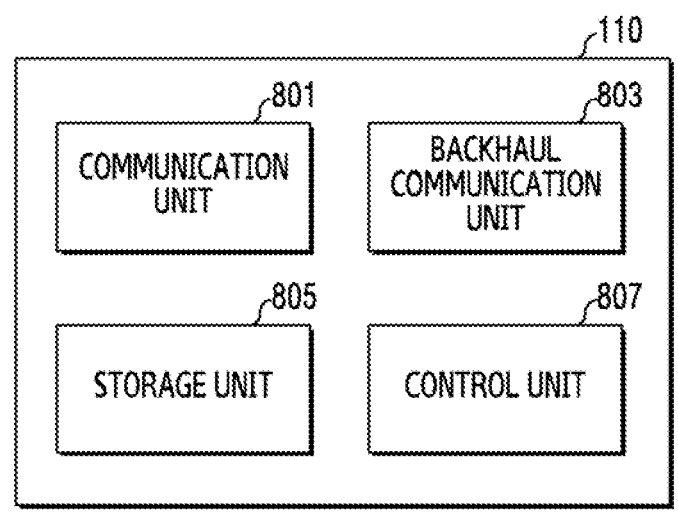
FIG. 8 illustrates a construction of a base station according to various embodiments of the present disclosure.

FIG. 8 illustrates a functional construction of a base station in a wireless communication system according to various embodiments of the present disclosure. Terms such as ' . . . unit' and ' . . . part' used below mean a unit that processes at least one function or operation, which may be implemented as hardware or software, or a combination of hardware and software.

Referring to FIG. 8, the base station 110 includes a communication unit 801, a backhaul communication unit 803, a storage unit 805, and a control unit 807.

The communication unit 801 performs functions for transmitting and/or receiving signals through a wireless channel. For example, the communication unit 801 performs a function of converting between a baseband signal and a bit stream according to a physical layer standard of the system. For example, when transmitting data, the communication unit 801 provides complex symbols by encoding and modulating a transmission bit stream. Also, when receiving data, the communication unit 801 restores a reception bit stream by demodulating and decoding a baseband signal. Also, the communication unit 801 up-converts the baseband signal into a radio frequency (RF) band signal, transmits the signal through an antenna, and down-converts an RF band signal received through the antenna into a baseband signal.

To this end, the communication unit 801 may include a transmission filter, a reception filter, an amplifier, a mixer, an oscillator, a digital to analog converter (DAC), an analog to digital converter (ADC), and the like. Also, the communication unit 801 may include a plurality of transmission/reception paths. Furthermore, the communication unit 801 may include at least one antenna array composed of a plurality of antenna elements. In terms of hardware, the communication unit 801 may be composed of a digital unit and an analog unit, and the analog unit may be composed of a plurality of sub-units according to operating power, operating frequency, etc. According to an embodiment, the communication unit 801 may include a unit forming a beam, that is, a beamforming unit. For example, the communication unit 801 may include a massive MIMO unit (MMU) for beamforming.

The communication unit 801 may transmit and/or receive signals. To this end, the communication unit 801 may include at least one transceiver. For example, the communication unit 801 may transmit a synchronization signal, a reference signal, system information, a message, control information, or data, etc. Also, the communication unit 801 may perform beamforming. The communication unit 801 may apply a beamforming weight to a signal to be transmitted and/or received in order to give a directionality of the setting of the control unit 807 to the signal. According to an embodiment, the communication unit 801 may provide a baseband signal according to a scheduling result and a transmission power determination result. Also, an RF unit in the communication unit 801 may transmit the provided signal through an antenna.

The communication unit 801 transmits and receives signals as described above. Accordingly, all or part of the communication unit 801 may be referred to as a 'transmitting unit', a 'receiving unit', or a 'transceiving unit'. Also, in the following description, transmission and reception performed through a wireless channel are used as a meaning including that the above-described processing is performed by the communication unit 801.

The backhaul communication unit 803 provides an interface for performing communication with other nodes in a network. That is, the backhaul communication unit 803 converts a bit stream transmitted from the base station to another node, for example, another access node, another base station, an upper node, a core network, etc., into a physical signal, and converts a physical signal received from the another node into a bit stream.

The storage unit 805 stores data such as a basic program, an application program, and setting information for an operation of the base station. The storage unit 805 may include a memory. The storage unit 805 may be configured as a volatile memory, a non-volatile memory, or a combination of the volatile memory and the non-volatile memory. And, the storage unit 805 provides the stored data according to a request of the control unit 807.

The control unit 807 controls overall operations of the base station. For example, the control unit 807 transmits and receives signals through the communication unit 801 or through the backhaul communication unit 803. And, the control unit 807 writes data to and reads data from the storage unit 805. And, the control unit 807 may perform functions of a protocol stack required by the communication standard. To this end, the control unit 807 may include at least one processor. According to various embodiments, the control unit 807 may control the base station to perform operations of the above-described various embodiments.

The construction of the base station 110 shown in FIG. 8 is only an example of the base station, and an example of the base station performing various embodiments of the present disclosure is not limited from the construction shown in FIG. 8. That is, according to various embodiments, some constructions may be added, deleted, or changed.

Although the base station has been described as one entity in FIG. 8, as described above, the present disclosure is not limited thereto. The base station of various embodiments of the present disclosure may be implemented to form an access network having distributed deployment as well as integrated deployment (e.g., eNB of LTE). As exemplified to describe the embodiments of FIG. 2A to FIG. 7, the base station is distinguished into a central unit (CU) and a digital unit (DU), and the CU may be implemented to perform upper layers (e.g., packet data convergence protocol (PDCP) and RRC) and the DU to perform lower layers (e.g., medium access control (MAC) and physical (PHY)).

In this way, the base station having the separate arrangement may further include a construction for front haul interface communication. According to an embodiment, the base station, as a DU, may perform functions for transmitting and/or receiving signals in a wired communication environment. The DU may include a wired interface for controlling a direct connection between a device and a device via a transmission medium (e.g., a copper wire and an optical fiber). For example, the DU may forward an electrical signal to another device through a copper wire, or perform conversion between an electrical signal and an optical signal. The DU may be connected to a CU of distributed deployment. However, this description is not construed as excluding a scenario in which the DU is connected to the CU through a wireless network. Also, the DU may be additionally connected to a radio unit (RU). However, this description is not construed as excluding a radio environment including only the CU and the DU.

Figure 9:
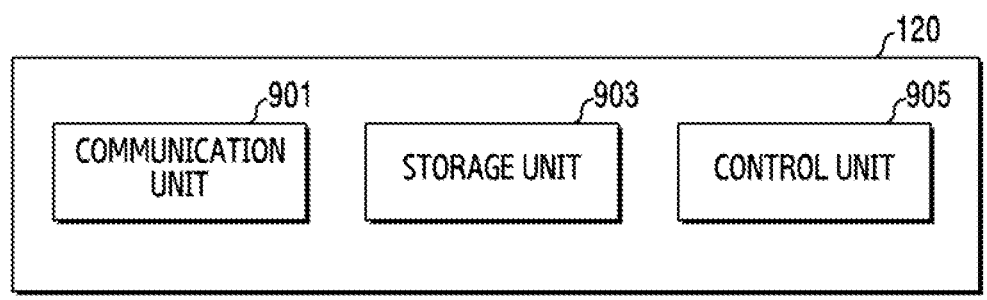
FIG. 9 illustrates a construction of a terminal according to various embodiments of the present disclosure.

FIG. 9 illustrates a functional construction of a terminal in a wireless communication system according to various embodiments of the present disclosure. Terms such as ' . . . unit' and ' . . . part' used below mean a unit that processes at least one function or operation, which may be implemented as hardware or software, or a combination of hardware and software.

Referring to FIG. 9, the terminal 120 includes a communication unit 901, a storage unit 903, and a control unit 905.

The communication unit 901 performs functions for transmitting and/or receiving signals through a wireless channel. For example, the communication unit 901 performs a function of converting between a baseband signal and a bit stream according to a physical layer standard of the system. For example, when transmitting data, the communication unit 901 provides complex symbols by encoding and modulating a transmission bit stream. Also, when receiving data, the communication unit 901 restores a reception bit stream by demodulating and decoding a baseband signal. Also, the communication unit 901 up-converts the baseband signal into an RF band signal and then transmits the signal through an antenna, and down-converts an RF band signal received through the antenna into a baseband signal. For example, the communication unit 901 may include a transmission filter, a reception filter, an amplifier, a mixer, an oscillator, a DAC, an ADC, and the like.

Also, the communication unit 901 may include a plurality of transmission/reception paths. Furthermore, the communication unit 901 may include an antenna unit. The communication unit 901 may include at least one antenna array composed of a plurality of antenna elements. In terms of hardware, the communication unit 901 may be composed of a digital circuit and an analog circuit (e.g., a radio frequency integrated circuit (RFIC)). Here, the digital circuit and the analog circuit may be implemented as one package. Also, the communication unit 901 may include a plurality of RF chains. The communication unit 901 may perform beamforming. The communication unit 901 may apply a beamforming weight to a signal to be transmitted and/or received, in order to give a directionality of the setting of the control unit 905 to the signal.

Also, the communication unit 901 may transmit and/or receive signals. To this end, the communication unit 901 may include at least one transceiver. The communication unit 901 may receive a downlink signal. The downlink signal may include a synchronization signal (SS), a reference signal (RS) (e.g., a cell-specific reference signal (CRS) and/or a demodulation (DM)-RS), system information (e.g., MIB, SIB, remaining system information (RMSI), other system information (OSI)), a configuration message, control information, or downlink data, etc. Also, the communication unit 901 may transmit an uplink signal. The uplink signal may include a random access-related signal (e.g., a random access preamble (RAP) (or message 1 (Msg1) and/or message 3 (Msg3))), a reference signal (e.g., a sounding reference signal (SRS) and/or DM-RS), or a buffer status report (BSR), etc.

Specifically, the communication unit 901 may include an RF processing unit and a baseband processing unit. The RF processing unit performs a function for transmitting and/or receiving a signal through a wireless channel, such as band conversion, amplification, etc., of the signal. That is, the RF processing unit up-converts a baseband signal provided from the baseband processing unit into an RF band signal and then transmits the RF band signal through an antenna, and down-converts an RF band signal received through the antenna into a baseband signal. For example, the RF processing unit may include a transmission filter, a reception filter, an amplifier, a mixer, an oscillator, a digital to analog converter (DAC), an analog to digital converter (ADC), and the like. Although only one antenna has been described in embodiments of the present disclosure, the terminal may have a plurality of antennas. Also, the RF processing unit may include a plurality of RF chains. Furthermore, the RF processing unit may perform beamforming. For the beamforming, the RF processing unit may adjust a phase and magnitude of each of the signals transmitted and/or received through the plurality of antennas or antenna elements.

The baseband processing unit performs a function of conversion between a baseband signal and a bit stream according to a physical layer standard of the system. For example, when transmitting data, the baseband processing unit provides complex symbols by encoding and modulating a transmission bit stream. Also, when receiving data, the baseband processing unit restores a reception bit stream by demodulating and decoding a baseband signal provided from the RF processing unit. For example, in the case of an orthogonal frequency division multiplexing (OFDM) scheme, when data is transmitted, the baseband processing unit provides complex symbols by encoding and modulating a transmission bit stream, maps the complex symbols to subcarriers, and then construct OFDM symbols through an inverse fast Fourier transform (IFFT) operation and cyclic prefix (CP) insertion. Also, when data is received, the baseband processing unit divides a baseband signal presented from the RF processing unit in the unit of an OFDM symbol, and restores signals mapped to subcarriers through a fast Fourier transform (FFT) operation, and then restores a reception bit stream through demodulation and decoding.

The communication unit 901 transmits and receives signals as described above. Accordingly, all or part of the communication unit 901 may be referred to as a transmitting unit, a receiving unit, or a transceiving unit. Furthermore, the communication unit 901 may include a plurality of communication modules in order to support a plurality of different wireless access technologies. Also, the communication unit 901 may include different communication modules in order to process signals of different frequency bands. For example, the different radio access technologies may include a wireless LAN (e.g., IEEE 802.1x), a cellular network (e.g., LTE, NR), and the like. Also, the different frequency bands may include a super high frequency (SHF) (e.g., 2.5 GHz, 5 GHz) band and a millimeter wave (e.g., 60 GHz) band. Also, the communication unit 901 may use the same type of radio access technology on different frequency bands (e.g., an unlicensed band for licensed assisted access (LAA) and/or citizens broadband radio service (CBRS) (e.g., 3.5 GHz)).

The storage unit 903 stores data such as a basic program, an application program, and setting information, etc. for an operation of the terminal. The storage unit 903 may be configured as a volatile memory, a non-volatile memory, or a combination of the volatile memory and the non-volatile memory.

The control unit 905 controls overall operations of the terminal. For example, the control unit 905 transmits and receives signals through the communication unit 901. Also, the control unit 905 writes data to and reads from the storage unit 903. And, the control unit 905 may perform functions of a protocol stack required by the communication standard. To this end, the control unit 905 may include at least one processor. The control unit 905 may include at least one processor or microprocessor, or may be a part of the processor. Also, a part of the communication unit 901 and the control unit 905 may be referred to as a CP. The control unit 905 may include various modules for performing communication. According to various embodiments, the control unit 905 may control the terminal to perform operations of various embodiments described later.

The control unit 905 may include a communication processor (CP) performing a control for communication and an application processor (AP) controlling an upper layer such as an application program, etc. According to various embodiments of the present disclosure, the control unit 905 may be configured to perform a function of dynamic spectrum sharing. According to an embodiment, the control unit 905 may be configured so that the terminal 120 dynamically uses an LTE cell and an NR cell in an EN-DC environment. Also, according to an embodiment, the control unit 905 may be configured so that the terminal 120 dynamically uses cells by two nodes in an MR-DC environment as well as the EN-DC environment. Besides, the control unit 905 may control the terminal to perform operations of various embodiments described above.

An apparatus and method of various embodiments of the present disclosure may maximize the performance of dynamic spectrum sharing (DSS), by providing signaling and an interface between DUs for spectrum sharing in a central unit (CU) and distributed unit (DU) separation structure. Effects obtainable in the present disclosure are not limited to the above-mentioned effects, and other effects not mentioned may be clearly understood by those of ordinary skill in the art to which the present disclosure belongs from the description.

Through FIG. 1 to FIG. 9, signaling between two nodes (e.g., signaling between DUs) for dynamic spectrum sharing has been described. Here, a unit in which procedures of forwarding information through signaling, setup, coordination, etc. are performed is a CU/DU/RU/cell may be implemented through an ID corresponding to each unit, that is, a CU ID, a DU ID, an RU ID, and a cell ID. In this case, the cell ID may indicate a cell in the form of a CGI or a PCI according to an embodiment. In an example, a resource coordination message configured in the unit of DU may include a corresponding DU ID. Also, in an example, a resource status report message reported in the unit of cell may include an ID of a corresponding cell.

The names of messages used in each procedure, such as an interface setup procedure, a resource coordination procedure, a resource status reporting procedure, etc., are used as examples to describe their functions, and messages of different names may be used to perform the same or similar functions.

Methods of the embodiments described in the claims or specifications of the present disclosure may be implemented in the form of hardware, software, or a combination of hardware and software.

When implemented in software, a computer-readable storage medium storing one or more programs (software modules) may be presented. The one or more programs stored in the computer-readable storage medium are configured to be executable by one or more processors in an electronic device. The one or more programs include instructions for causing the electronic device to execute methods of embodiments described in the claim or specification of the present disclosure. The computer-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Such programs (software modules and software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), or other optical storage devices or magnetic cassettes. Or, it may be stored in a memory composed of a combination of some or all thereof. Also, each configuration memory may be included in plurality as well.

Also, the program may be stored in an attachable storage device that may be accessed through a communication network such as the Internet, an intranet, a local area network (LAN), a wide area network (WAN), or a storage area network (SAN), or a communication network consisting of a combination thereof. This storage device may be connected to a device performing an embodiment of the present disclosure through an external port. Also, a separate storage device on the communication network may be connected to the device performing the embodiment of the present disclosure as well.

In specific embodiments of the present disclosure described above, components included in the disclosure are expressed as singular or plural according to the specific embodiments presented. However, the singular or plural expression is appropriately selected for the context presented for convenience of description, and the present disclosure is not limited to the singular or plural component, and even if a component is expressed as plural, it may be composed of singular, or even if the component is expressed in the singular number, it may be composed of plural.

Although specific embodiments have been described in a detailed description of the present disclosure, various modifications are possible without departing from the scope of the present disclosure. Therefore, the scope of the present disclosure should not be limited to the described embodiments and should be defined by the claims described below as well as equivalents to these claims.

What is claimed is:

1. A method performed by a distributed unit (DU) of a first base station in a wireless communication system, the method comprising:

transmitting, to a second base station supporting a second cell that shares a frequency band of a specified range with a first cell of the first base station, a message comprising information related to spectrum sharing via a DU interface; and receiving, from the second base station, a setup response corresponding to a setup request for the DU interface, via the DU interface, wherein the setup request is included in the message, and wherein the information related to the spectrum sharing comprises identification information on the first cell, identification information on the second cell and at least one of a cell identifier (ID) related to the spectrum sharing or resource information related to the first cell or the second cell.

2. The method of claim 1, further comprising:

receiving, from the second base station, a resource coordination request via the DU interface; and transmitting, to the second base station, a resource coordination response corresponding to the resource coordination request via the DU interface, wherein the resource coordination request comprises the identification information on the first cell, the identification information on the second cell, and pattern information determined based on a resource allocated to the first cell and a resource allocated to the second cell.

3. The method of claim 1, further comprising transmitting, to the first base station, a resource status report via the DU interface, wherein the resource status report comprises at least one of the identification information on the first cell, the identification information on the second cell, a number of terminals connected to the first cell, a guaranteed bit-rate (GBR) by at least one of downlink (DL) or uplink (UL), a non-GBR, a total physical resource block (PRB) usage, a number of heavy users, or a resource allocation failure rate.

4. The method of claim 1, wherein the first cell is a cell related to new radio (NR), and the second cell is a cell related to long term evolution (LTE), and wherein the first base station comprises a next generation Node B (gNodeB, gNB), the gNB comprises a gNB CU, the DU of the first base station comprises a gNB-DU, and the second base station comprises an E-UTRAN Node B (eNodeB, eNB).

5. A method performed by a second base station in a wireless communication system, the method comprising:

receiving, from a distributed unit (DU) of a first base station supporting a first cell, a message comprising information related to spectrum sharing via a DU interface; and transmitting, to the DU of the first base station, a setup response corresponding to a setup request for the DU interface, via the DU interface, wherein the setup request is included in the message, wherein the first cell and a second cell of the base station share a frequency band of a specified range, and wherein the information related to the spectrum sharing comprises identification information on the first cell, identification information on the second cell and at least one of a cell identifier (ID) related to the spectrum sharing or resource information related to the first cell or the second cell.

6. The method of claim 5, further comprising:

transmitting, to the DU of the first base station, a resource coordination request via the DU interface; and receiving, from the DU of the first base station, a resource coordination response corresponding to the resource coordination request via the DU interface, wherein the resource coordination request comprises the identification information on the first cell, the identification information on the second cell, and pattern information determined based on a resource allocated to the first cell and a resource allocated to the second cell.

7. The method of claim 5, further comprising receiving, from the DU of the first base station, a resource status report via the DU interface,
wherein the resource status report comprises at least one of the identification information on the first cell, the identification information on the second cell, a number of terminals connected to the first cell, a guaranteed bit-rate (GBR) by at least one of downlink (DL) or uplink (UL), a non-GBR, a total physical resource block (PRB) usage, a number of heavy users, or a resource allocation failure rate.

8. The method of claim 5, wherein the first cell is a cell related to new radio (NR), and the second cell is a cell related to long term evolution (LTE), and
wherein the second base station comprises a next generation Node B (gNodeB, gNB), the gNB comprises a gNB CU, the DU of the first base station comprises a gNB-DU, and the first base station comprises an E-UTRAN Node B (eNodeB, eNB).

9. A distributed unit (DU) of a first base station in a wireless communication system, the DU of the first base station comprising:
at least one transceiver;
at least one processor communicatively coupled to the at least one transceiver; and
at least one memory communicatively coupled to the at least one processor and storing instructions executable by the at least one processor individually or in any combination to cause the DU of the first base station to:
transmit, to a second base station supporting a second cell that shares a frequency band of a specified range with a first cell of the first base station, a message comprising information related to spectrum sharing via a DU interface, and
receive, from the second base station, a setup response corresponding to a setup request for the DU interface, via the DU interface,
wherein the setup request is included in the message, and
wherein the information related to the spectrum sharing comprises identification information on the first cell, identification information on the second cell and at least one of a cell identifier (ID) related to the spectrum sharing or resource information related to the first cell or the second cell.

10. The DU of the first base station of claim 9, wherein the instructions further cause the DU of the first base station to:
receive, from the second base station, a resource coordination request via the DU interface; and
transmit, to the second base station, a resource coordination response corresponding to the resource coordination request via the DU interface, and
wherein the resource coordination request comprises the identification information on the first cell, the identification information on the second cell, and pattern information determined based on a resource allocated to the first cell and a resource allocated to the second cell.

11. The DU of the first base station of claim 9, wherein the instructions further cause the DU of the first base station to transmit, to the first base station, a resource status report via the DU interface, and
wherein the resource status report comprises at least one of the identification information on the first cell, the identification information on the second cell, a number of terminals connected to the first cell, a guaranteed bit-rate (GBR) by at least one of downlink (DL) or uplink (UL), a non-GBR, a total physical resource block (PRB) usage, a number of heavy users, or a resource allocation failure rate.

12. The DU of the first base station of claim 9, wherein the first cell is a cell related to new radio (NR), and the second cell is a cell related to long term evolution (LTE), and
wherein the first base station comprises a next generation Node B (gNodeB, gNB), the gNB comprises a gNB CU, the DU of the first base station comprises a gNB-DU, and the second base station comprises an E-UTRAN Node B (eNodeB, eNB).

13. A second base station in a wireless communication system, the second base station comprising:
at least one transceiver;
at least one processor communicatively coupled to the at least one transceiver; and
at least one memory communicatively coupled to the at least one processor and storing instructions executable by the at least one processor individually or in any combination to cause the second base station to:
receive, from a distributed unit (DU) of a first base station supporting a first cell, a message comprising information related to spectrum sharing via a DU interface, and
transmit, to the DU of the first base station, a setup response corresponding to a setup request for the DU interface, via the DU interface,
wherein the setup request is included in the message,
wherein the first cell and a second cell of the base station share a frequency band of a specified range, and
wherein the information related to the spectrum sharing comprises identification information on the first cell, identification information on the second cell and at least one of a cell identifier (ID) related to the spectrum sharing or resource information related to the first cell or the second cell.

14. The second base station of claim 13, wherein the instructions cause the second base station to:
transmit, to the DU of the first base station, a resource coordination request via the DU interface; and
receive, from the DU of the first base station, a resource coordination response corresponding to the resource coordination request via the DU interface,
wherein the resource coordination request comprises the identification information on the first cell, the identification information on the second cell, and pattern information determined based on a resource allocated to the first cell and a resource allocated to the second cell.

15. The second base station of claim 13, wherein the instructions further cause the second base station to receive, from the DU of the first base station, a resource status report via the DU interface, and
wherein the resource status report comprises at least one of the identification information on the first cell, the identification information on the second cell, a number of terminals connected to the first cell, a guaranteed bit-rate (GBR) by at least one of downlink (DL) or uplink (UL), a non-GBR, a total physical resource block (PRB) usage, a number of heavy users, or a resource allocation failure rate.

16. The second base station of claim 13, wherein the first cell is a cell related to new radio (NR), and the second cell is a cell related to long term evolution (LTE), and wherein the second base station comprises a next generation Node B (gNodeB, gNB), the gNB comprises a gNB CU, the DU of the first base station comprises a gNB-DU, and the first base station comprises an E-UTRAN Node B (eNodeB, eNB).

* * * * *